(12) United States Patent
Verghese

(10) Patent No.: US 7,038,709 B1
(45) Date of Patent: May 2, 2006

(54) SYSTEM AND METHOD FOR TRACKING A SUBJECT

(76) Inventor: Gilbert Verghese, 6 Hoskin Avenue, Suite 360, Toronto, Ontario (CA) M5S 1H8

( * ) Notice: Subject to any disclaimer, the term of this patent is extended or adjusted under 35 U.S.C. 154(b) by 748 days.

(21) Appl. No.: 09/702,788

(22) Filed: Nov. 1, 2000

(51) Int. Cl.
*H04N 5/225* (2006.01)
*H04N 5/228* (2006.01)

(52) U.S. Cl. ............... 348/169; 348/208.1; 348/208.14

(58) Field of Classification Search ........ 348/169–172, 348/208.1, 208.2, 208.3, 208.4, 208.14, 273, 348/152–155
See application file for complete search history.

(56) References Cited

U.S. PATENT DOCUMENTS

| | | | |
|---|---|---|---|
| 4,008,372 A | 2/1977 | Ueno et al. ................ 358/227 |
| 4,047,448 A | 9/1977 | Pardo et al. ................ 74/417 |
| 4,264,928 A | 4/1981 | Schober ................ 358/125 |
| 4,396,945 A | 8/1983 | DiMatteo et al. ........... 358/107 |
| 5,231,483 A | 7/1993 | Sieber et al. ................ 358/125 |
| 5,280,530 A | 1/1994 | Trew ................ 382/1 |
| 5,416,513 A | 5/1995 | Morisaki ................ 348/169 |
| 5,606,368 A | 2/1997 | Corradini ................ 348/373 |
| 5,802,412 A * | 9/1998 | Kahn ................ 396/427 |
| 5,838,366 A | 11/1998 | Snape et al. ................ 348/170 |
| 5,973,726 A | 10/1999 | Iijima et al. ................ 348/38 |
| 6,027,257 A | 2/2000 | Richards et al. |
| 6,593,956 B1* | 7/2003 | Potts et al. ................ 348/14.09 |
| 6,714,236 B1* | 3/2004 | Wada et al. ................ 348/152 |

* cited by examiner

*Primary Examiner*—Ngoc-Yen Vu
*Assistant Examiner*—Kelly L. Jerabek
(74) *Attorney, Agent, or Firm*—Bereskin & Parr; Isis E. Caulder

(57) ABSTRACT

An image tracking system for generating digitized image frames of a moving object using an image capture device and a position control device. The image capture device and determining a location value for an object image within each of the digitized image frames. The position control device is coupled to the image capture device to receive the location value of the object image and generates a plurality of control signals which are sent to the position manipulating device. The position control device also uses the plurality of control signals and generates a plurality of rotational movements which position the image capture device, such that the location value of the object image remains within a center region of each of the digitized image frames and such that rotation along different rotation axis occurs independently.

52 Claims, 18 Drawing Sheets

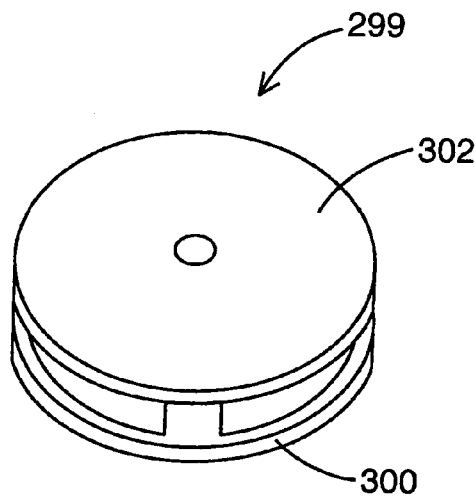
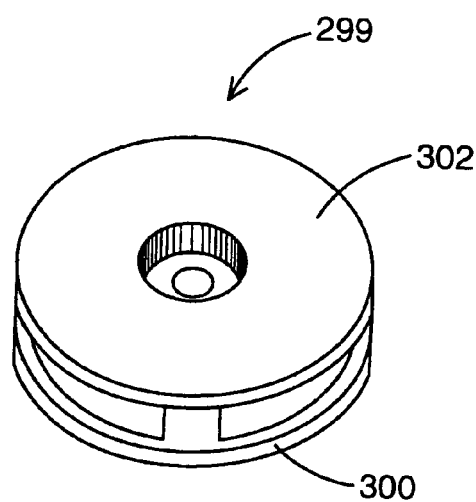
FIG. 10A                FIG. 10B
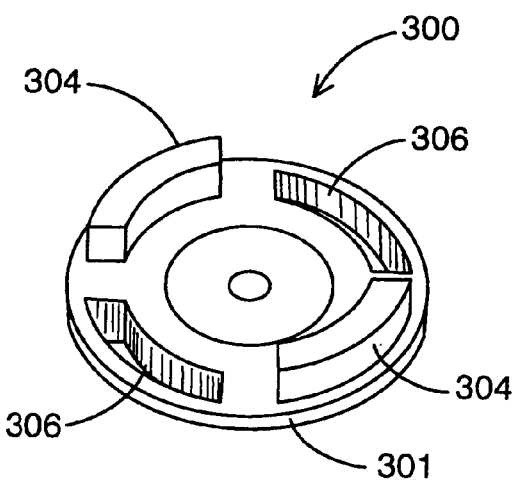
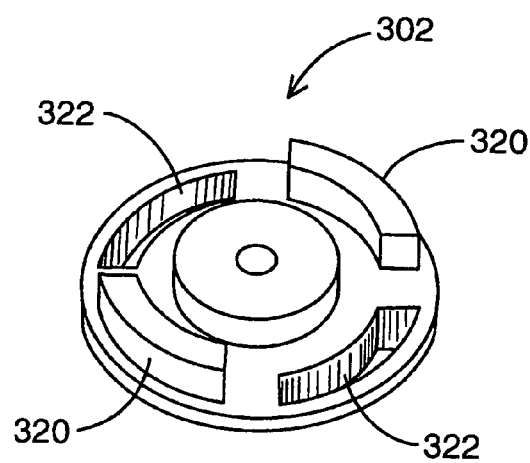
FIG. 10C                FIG. 10D

SYSTEM AND METHOD FOR TRACKING A SUBJECT

FIELD OF THE INVENTION

The present invention relates to an image tracking system, and more particularly to an image tracking system for video conferencing or computer based image communication applications.

BACKGROUND OF THE INVENTION

Increases in computer processor speeds into the Ghz region, and increases in bandwidth capacities and transmission speeds of networking devices are providing personal computer users with the capabilities of watching live camera generated images as they are transmitted across the internet.

These advances have increased the quality of transmitted images and feasibility of video conferencing using personal computers in both the home and the office. The importance of video conferencing for quick and efficient communication in the business world places a need for effective video conference systems for the personal computer which use low cost commercial components to achieve dynamic features suited to a live conference environment.

There are many instances during a video conferencing session whereby the user is required to move from behind his or her computer in order to demonstrate or present a device, object or corporate information of some sort. To achieve such a dynamic video conferencing environment, an image tracking system which includes an image capture device such as digital camera must effectively track a user's movements. Such a system must be easily installed on the computer and comprise a light weight, low cost and easily manufacturable mechanical components for providing efficient camera movement.

U.S. Pat. No. 4,264,928 describes a video conference system which uses a servo-motor controlled mirror to project the image of a person at a conference room table onto a TV camera when he or she talks into a microphone. The invention provides a method of tracking a person when they speak into a microphone. Based on the strength of the signals received from each persons microphone, the servo-motors position the mirror to project the image of the person talking onto the TV camera. This system is limited to televising conferences where all participants are in the same room rather than providing video conferencing for participants in remote geographical locations. Furthermore, the system incorporates motors for rotating a mirror rather than rotating the inherent weight of the TV camera.

U.S. Pat. No. 5,416,513 describes a video camera for tracking an object by comparing a specific color picked from the image to a specific color stored as a reference. Based on the processed results from comparing the specific color stored as a reference and the image received from the camera, a motor rotates and tilts the camera to follow the region in which the specific color signal detected in the image is larger than in others. However, a mechanical structure for providing efficient tilt and pan movements has not been defined.

U.S. Pat. No. 5,606,368 describes a pan and tilt mounting system for providing movement for cameras and related devices. The use of a cable drive in the system eliminates the inaccuracy inherent in similar gear driven systems. The invention does not pay particular attention to the mounting position of the motors which affects the movement efficiency. The invention discusses a tilt motor for controlling tilt movement and a pan motor for controlling rotational (panning) movement, whereby the mass of the tilt motor is subject to the rotational movement provided by the pan motor. This type of "motor loading" configuration reduces the efficiency of the pan motor and increases the torque requirements.

Accordingly, there is a need for an image tracking system for video conferencing or computer based image communication applications which is capable of effectively and efficiently tracking the movements of a user, which is relatively inexpensive to manufacture and which is easily operable.

SUMMARY OF THE INVENTION

It is therefore an object of the present invention in one aspect to provide an image tracking system for use with an image capture device which obtains digitized image frames of an object, the image tracking system comprising:
  (a) a support for holding the image capture device;
  (b) a processing device for determining an object location value for the object based on the digitized image frames generated by the image capture device;
  (c) a position control device coupled to the support for, in use, rotating the support and the image capture device mounted therein about two axes based on the object location such that the object remains within a center region of each of the digitized image frames, said position control device comprising:
    (i) a base;
    (ii) a first motor mounted on the base for generating a first rotational movement based on the object location and a first rotatable member mounted to the base for rotation about a first rotation axis, said first rotatable member being coupled to the first motor;
    (iii) a second motor mounted on the base for generating a second rotational movement based on the object location and a second rotatable member comprising the support mounted to the first rotatable member for rotation about a second rotation axis and being coupled to the second motor;
    (iv) said first motor comprising a first shaft member having a first shaft rotation axis longitudinally concentric with the first shaft member, and said second motor comprising a second shaft member having a second shaft rotation axis longitudinally concentric with the second shaft member;
    (v) a tendon for coupling the second shaft member to the second rotatable member;
    (vi) at least one point on the tendon remaining fixed relative to the second rotation axis when said first shaft member rotates and said second shaft member is stationary, such that the first rotatable movement produced by the rotation of the first shaft element is independent of the second rotatable movement produced by the rotation of the second shaft element.

In another aspect, the present invention provides an image tracking system for use with first and second image capture devices which obtains digitized image frames of an object, the image tracking system comprising:
  (a) a first support for holding the first image capture device and a second support for holding the second image capture device;
  (b) a processing device for determining an object location value for the object based on the digitized image frames generated by the image capture device;

(c) a position control device coupled to the support for, in use, rotating the first and second supports and the first and second image capture devices mounted therein about four axes based on the object location such that the object remains within a center region of each of the digitized image frames, said position control device comprising:
   (i) a base;
   (ii) a first motor mounted on the base for generating a first rotational movement based on the object location and a first rotatable member mounted to the base for rotation about a first rotation axis, said first rotatable member being coupled to the first motor;
   (iii) a second motor mounted on the base for generating a second rotational movement based on the object location and a second rotatable member mounted to the first rotatable member for rotation about a second rotation axis and being coupled to the second motor;
   (iv) a third rotatable member comprising the first support and a fourth rotatable member comprising the second support, said third and fourth rotatable members being mounted on the second rotatable member, at least one of said third and fourth rotatable members being rotatably mounted to said second rotatable member; and
   (v) a third motor mounted on the base for providing relative rotation between said third and said fourth rotatable members.

In another aspect, the present invention provides a method of tracking an object, said method comprising:
   (a) obtaining a series of digitized image frames from the image capture device;
   (b) identifying the object within each of the digitized frames; and
   (c) providing a first rotational movement to the image capture device about a first rotation axis and providing a second rotational movement to the image capture device about a second rotation axis such that the object remains within a center region of each of the digitized frames, using:
      (I) a first motor having a first shaft member with a first shaft rotation axis longitudinally concentric with the first shaft member, and said second motor having a second shaft member with a second shaft rotation axis longitudinally concentric with the second shaft member
      (II) a tendon for coupling the second shaft member to the second rotatable member;
      (III) at least one point on the tendon remaining fixed relative to the second rotation axis when said first shaft member rotates and said second shaft member is stationary, such that the first rotatable movement produced by the rotation of the first shaft element is independent of the second rotatable movement produced by the rotation of the second shaft element.

In another aspect, the present invention provides a tension regulation device for controlling the amount of tension applied to a tendon, said tension regulation device comprising:
   (a) a platform;
   (b) a resilient column rotatably mounted on the platform and having a cross-section with a first radius;
   (c) a splined column rotatably mounted on the platform and having a plurality of spline members extending radially and having a cross-section with a second outer radius, said splined column being adapted to receive a portion of the tendon therearound;
   (d) said resilient column being spaced apart from said splined column and rotatably mounted on said platform at a distance equal to slightly less than the sum of the first and second radius; and
   (e) such that in the absence of tension the spline members slightly deform said resilient column to restrict rotational movement of said spline column and said tendon and in the presence of tension, the spline members are forced to travel along the surface of said resilient column and to unwind the portion of the tendon around the splined column.

In another aspect, the present invention provides a tendon motor pulley for coupling a tendon length to a motor shaft, said tendon motor pulley comprising:
   (a) a first disc;
   (b) an second disc, the first and second discs having facing surfaces;
   (c) a hub positioned concentrically between said first and second discs; and
   (d) at least one engagement means extending between the first and second discs and located radially outwardly from the hub, whereby a tendon can travel freely around the hub and the engagement means engages the tendon.

BRIEF DESCRIPTION OF THE DRAWINGS

In the accompanying drawings:

FIGS. 10A and 10B are perspective views of the assembled tendon motor pulley of the image tracking system of FIG. 1;

FIGS. 10C and 10D are perspective views of the upper and lower tendon wheels, respectively, of the image tracking system of FIG. 1;

DETAILED DESCRIPTION OF THE PREFERRED EMBODIMENT

Figure 1:
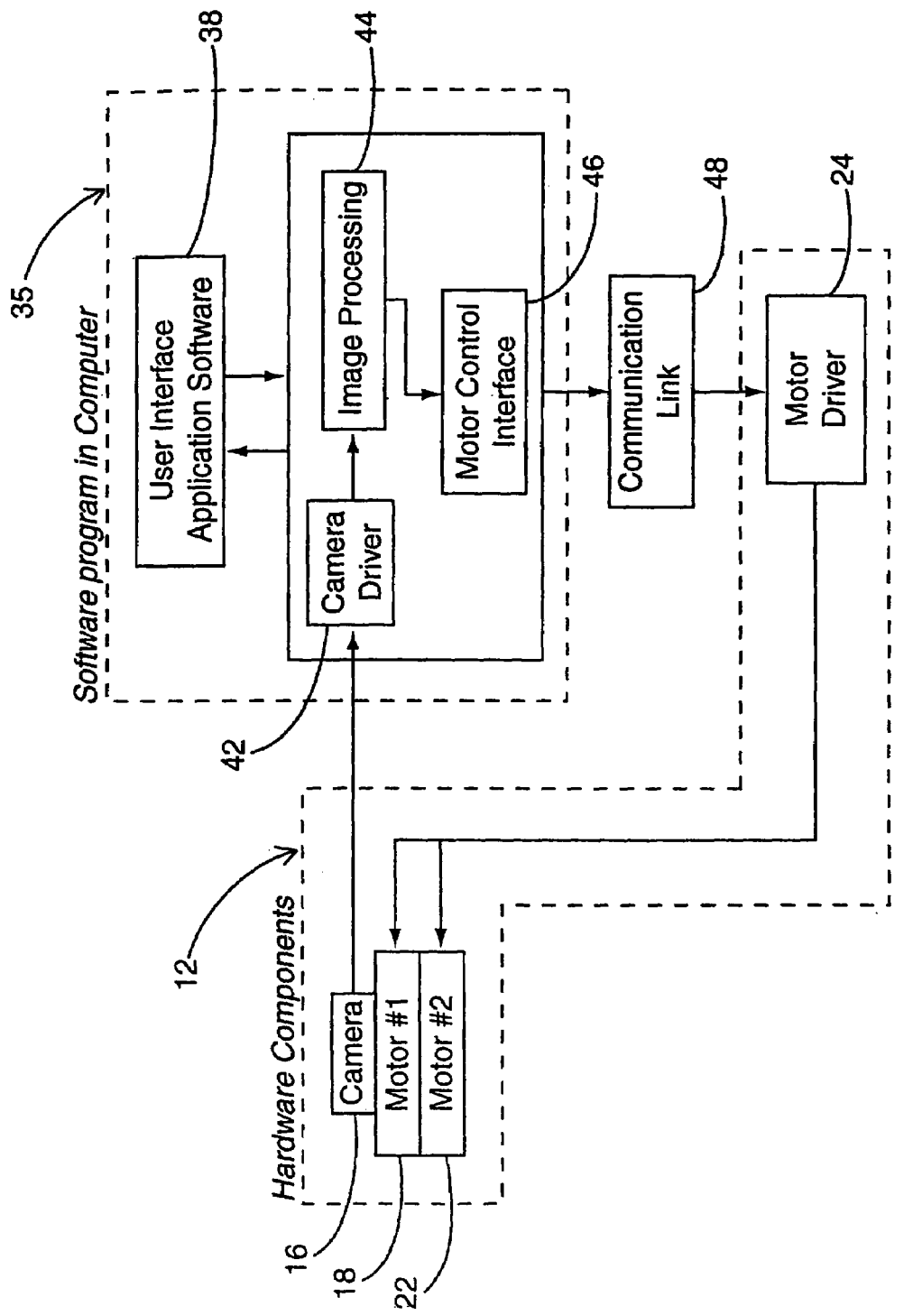
FIG. 1 is a block diagram of a preferred embodiment of the image tracking system of the present invention.

Reference is first made to FIG. 1, which show a functional block diagram of the image tracking system 10 made in accordance with a preferred embodiment of the invention. The image tracking system 10 comprises a hardware subsystem 12 and software subsystem 35. The hardware subsystem 12 includes a digital video camera 16, a motor driver 24, a first motor device 18 and a second motor device 22. The software subsystem 35 includes a user interface 38 and an image capture and processing stage 40. The image capture and processing stage 40 comprises a camera driver component 42, an image processing component 44 and a motor control interface component 46.

Overview

Generally, the image tracking system 10 processes digitized images that are received from an image capture device such as camera 16. Image processing of the digitized images generates a location value corresponding to the object image. Based on this location value, appropriate control signals are generated for controlling the orientation and position of the video camera. The orientation and position of the camera is varied in order for the camera to track the movement of an object image within the digitized image, wherein the object image is a human subject. While the following discussion will assume that camera 16 is a digital video camera, it should be understood that any type of image processing device could be used (e.g. analog video camera) in conjunction with an appropriate data conversion device for generating digital data for use by image tracking system 10.

Still referring to FIG. 1, the user interface 38 provides features such as a software generated graphical window for viewing the camera generated image, also allowing the user to control the size and quality of the image within the window. Other features of the user interface 38 include the ability to override the image tracking function of the image tracking system 10 in favour of user positioning, whereby the user can directly position and move the camera 16 by appropriately operating a computer pointing device.

The camera driver 42 provides the necessary synchronization and data accessing protocol, for interfacing image data corresponding to digitized image frames generated by the video camera 16 to the image processing component 44. The camera driver 42 ensures that image data is presented to the image processing component 44 at the required rate (any rate) and that the image processing component 44 can access image data corresponding to any region (an object image) within each of the digitized image frames. The camera driver 42 essentially provides the necessary interfacing between different cameras and manufacturer-supplied drivers, and the image processing component 44.

Once the image data is received by the image processing component 44 of the software subsystem 35, a color tracking algorithm is used for determining an area of color associated with a human subject within the digitized image. The color associated with a human subject could be pre-set to be a certain labelling color (i.e. a blue colored wearable button) or it can be the person's skintone. The color region of a human subject is located within the digitized image by scanning image pixels. For efficient real time color detection, the pixel area occupied by the digitized image is scanned radially, where the radial scanning starts at the center of the image, moving progressively outwards toward the border of the image. While the following discussion will assume that the color region to be analyzed for a particular human subject is in fact their skintone, it should be understood that any other type of color region could be used for subject tracking and identification.

Skintone detection is based on color values determined from the RGB-24 video signals from the video camera 16. The pixels depicting skintone are detected and processed in order to generate a position of optimal correlation, which corresponds to a center point within a prominent skintone region. This calculated center point is called a centroid and has coordinate position value, which is used to detect image movement and generate camera movement signals for tracking the skintone area of the human subject as he or she moves.

The motor control interface 46 within the software subsystem 40 communicates with a position control device referred to as a motor driver 24 using a communication link 48, such as a direct link, an RS232 serial link, USB or wireless link. The motor driver 24 comprises a microcontroller device (see FIG. 3A, reference character 114) with programmed firmware for receiving and processing position movement instructions from the motor control interface 46.

The motor control interface 46 transmits a two byte position movement instruction frame to the motor driver 24. The instruction frame comprises: two control bits for indicating a selected servo-motor for positional manipulation, an 8-bit word for generating the value of positional movement or manipulation required by the selected servo-motor, and control bits for indicating the status of the servo-motors (e.g. standby mode). The 8-bit word representing positional movement, corresponds to 256 discrete position values, wherein each position value generates a specific angular displacement for either the first motor 18 or the second motor 22. In accordance with the present invention the first and second motor 18, 22 are servo-motors responsible for the rotation movement and tilt movement of the camera 16 respectively. However, it will be appreciated that other types of motor device, data communication protocol, and position resolution values may be used in association with the image tracking system 10, without departing from the scope of the present invention.

The motor driver 24 controls the positional movement of the first motor 18 and the second motor 22 by converting the corresponding values of positional movement (0–255) received from the motor control interface 46 (command frames) to a first and second pulse width modulated (PWM) control signal. The first and second PWM control signals are responsible for generating rotational movement for the first and second motors 18, 22. The PWM signal is a pulse train having a fixed period (e.g. 20 ms) with a variable pulse width (e.g. 1–2 ms). Each value of positional movement (0–255) received by the motor driver generates a PWM signal of specific pulse width value.

Once the PWM signal from the motor driver 24 is received by the designated motor (first motor 18 or second motor 22), based on the pulse width of the PWM signal, the designated motor's shaft rotates to a specific angular position somewhere in the range of 0–180 degrees. The motor 18, 22 positions are normally initialized to a mid-range position of 90 degrees by applying a 1.5 ms PWM signal to their input. By varying the PWM signal between 1.5 ms and 1 ms, the first and second motor 18, 22 shafts will rotate between 90 and 0 degrees. Similarly, by varying the PWM signal between 1.5 ms and 2 ms, the designated motor's 18, 22 shaft will rotate between 90 and 180 degrees.

Image Tracking Hardware

Figure 2:
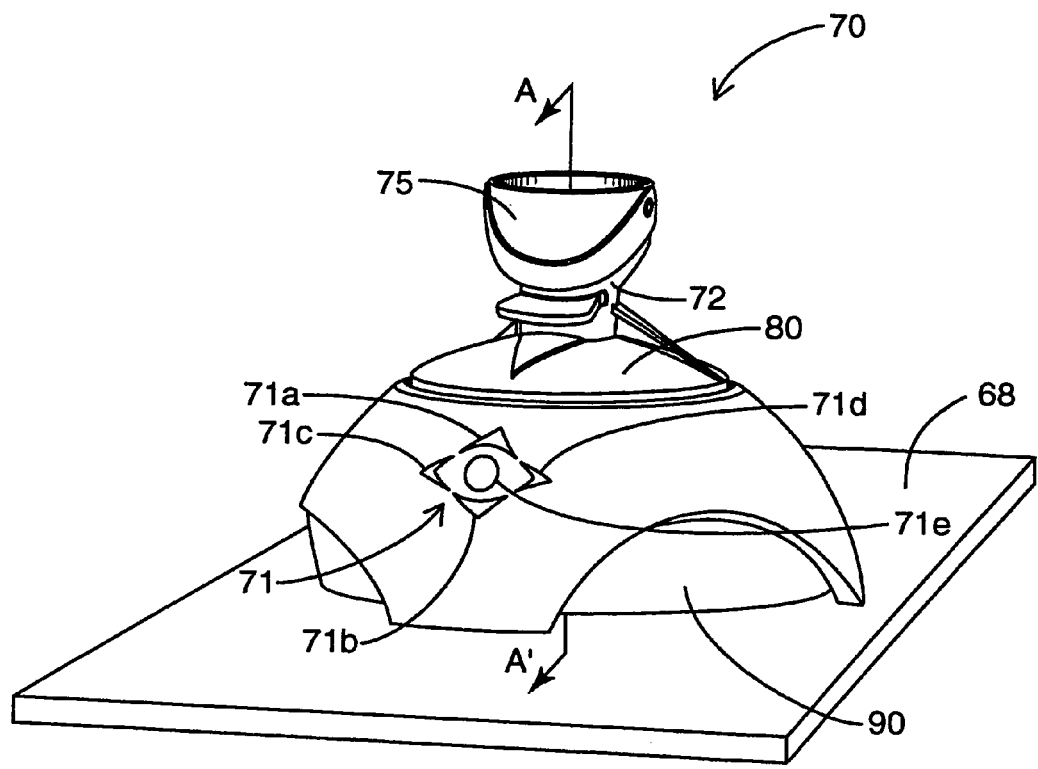
FIG. 2 is a perspective view of a position manipulating device of the image tracking system of FIG. 1.

FIG. 2 shows a three-dimensional perspective view of a position manipulating device 70 for both mounting and varying the positional movement of the camera (not shown). The position manipulating device 70 comprises a collar member 80 which provides the first rotational movement. The second rotatable member of the position manipulating device 70 is a neck member 72 which provides the second rotational movement.

Position manipulating device 70 also includes a direction indicator 71 mounted on the front surface of position manipulating device 70 which is adapted to indicate operation to the user. Specifically, direction indicator 71 comprises an UP indicator 71a, a DOWN indicator 71b, a LEFT indicator 71c, a RIGHT indicator 71d and a TRACKING indicator 71e. UP indicator 71a, a DOWN indicator 71b, a LEFT indicator 71c, and RIGHT indicator 71d all indicate the direction in which position manipulating device 70 is moving. TRACKING indicator 71e indicates to the user that image tracking system 10 has identified the subject and is tracking the subject.

The neck 72 has a hemispherical shape which supports and secures an annular shaped camera support member 75. The video camera (not shown) is mounted on the position manipulation device 70 by means of the camera support member 75 attached to the neck 72. The position manipulating device 70 further includes a stationary base member 90 for contacting a support surface 68 and supporting the collar member 80, the neck 72 and the camera support member 75. The first rotational movement of the collar 80 is a pan movement (rotation) and the second rotational movement of the neck 72 is a tilt movement.

Therefore, the video camera (not shown in FIG. 2) is rotated by means of the pan movement of the collar 80, whilst being simultaneously tilted by the tilt movement of the neck 72. The first motor 18 generates the first rotational movement referred to as the pan movement of the collar member 80, and the second motor 22 generates the second rotational movement referred to as the tilt movement of the neck 72.

Figure 3A:
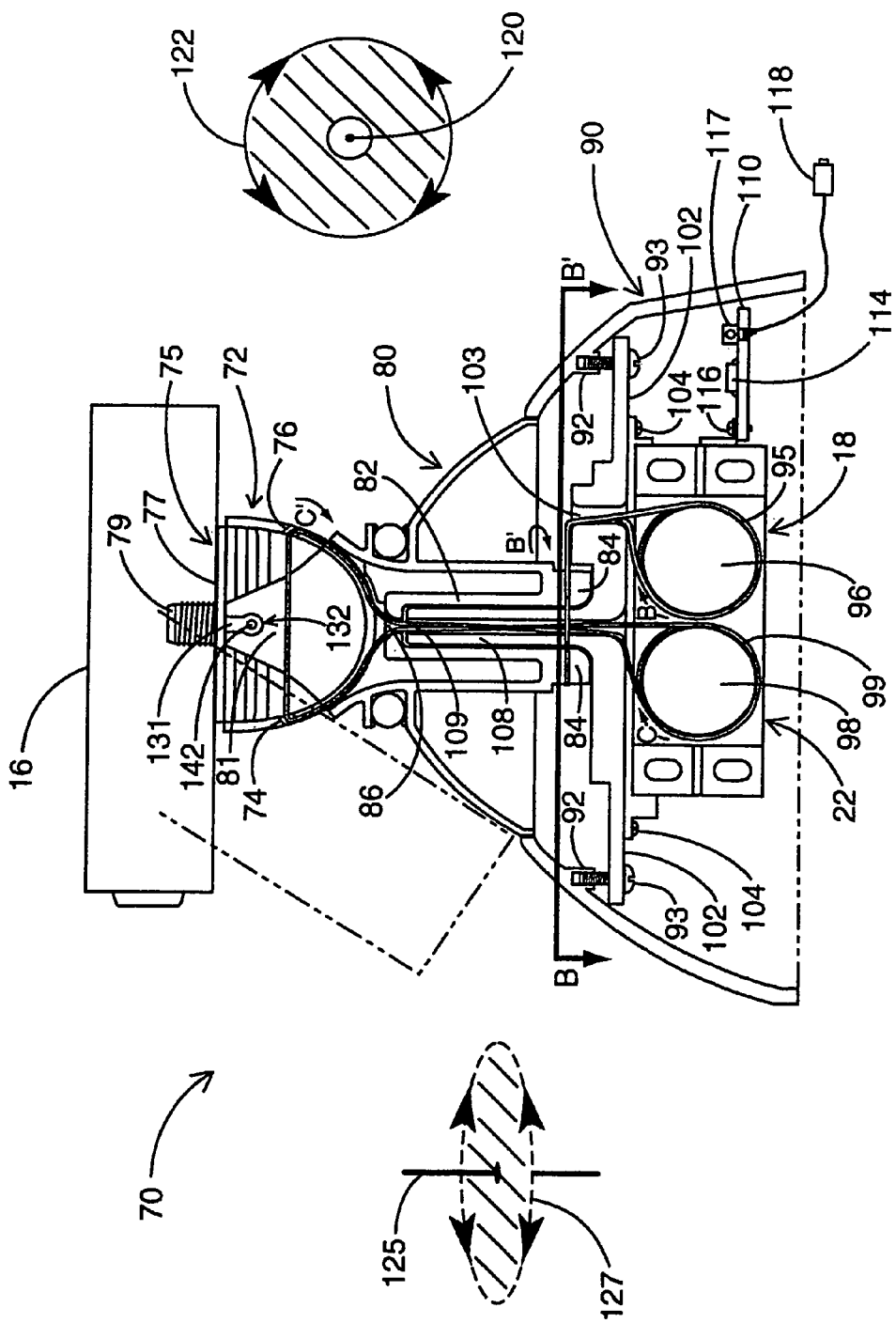
FIG. 3A is a vertical cross sectional view of the position manipulating device illustrated in FIG. 2 along the line AA'.

FIG. 3A shows a vertical cross sectional view along the line AA' of the position manipulating device 70 illustrated in FIG. 2. The base member 90 is hollow and houses a mounting member 100, the motor driver which comprises a microcontroller device 114, and both the first and second motors 18, 22. The mounting member 100 rigidly attaches to a set of four securing points 92 (only two are shown) on the base member 90 by means of four securing screws 93 (only two are shown). The mounting member 100 includes a first vertical shaft portion 108 for engaging the collar member 80. The collar member 80 comprises a cylindrical cavity region enclosed within a cylindrical housing 82, wherein the cavity region receives the first vertical shaft portion 108 of the mounting member 100 such that the collar member 80 is rotatably mounted on the first vertical shaft portion 108. Consequently, the base member 90 and attached mounting member 100 are stationary with respect to the rotatable collar member 80. The pan movement of the collar member 80 has a first plane of rotation 127 about a fixed first rotation axis, as defined by 125. The pan movement of the collar member 80 defines the pan movement of the position manipulating device 70.

Figure 3B:
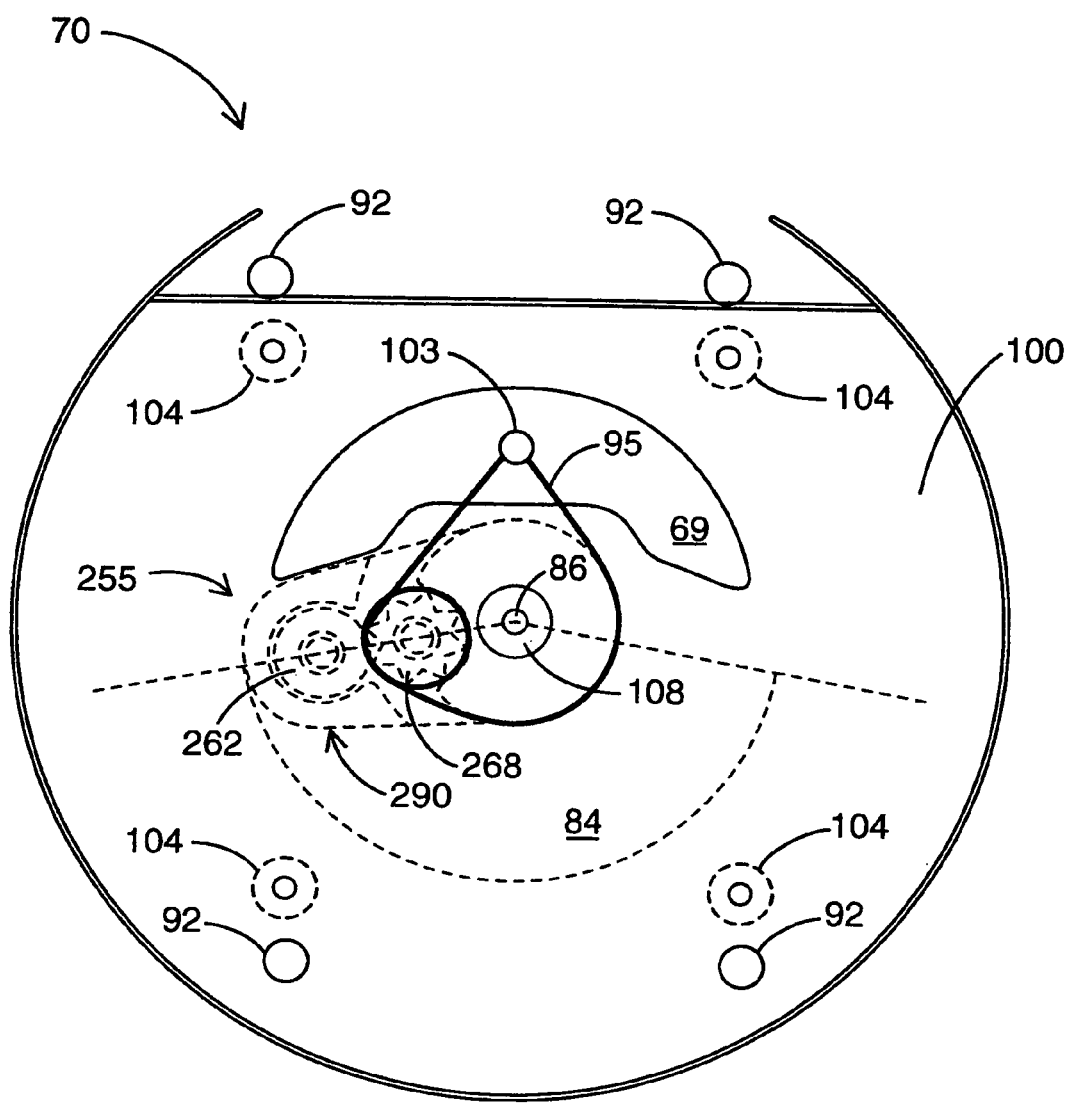
FIG. 3B is a horizontal cross sectional view of the position manipulating device illustrated in FIG. 3A along the line BB'.

FIG. 3B shows a horizontal cross sectional view along the line BB' of the position manipulating device 70 illustrated in FIG. 2. Specifically, the mounting member 100 is shown having four securing points 92 and the securing screws 104 which couple the motors 18, 22 to the under surface 102 of the mounting member 100. Further, first vertical shaft portion 108 is shown in cross-section located at the center of mounting member 100. Also shown is a motion restricting member 69 which is adapted to restrict pan motion of the collar 80 to within a range of approximately 160° as indicated by angle A. It should be understood that other movement ranges could be implemented within position manipulating device 70 by suitably changing the configuration of motion restricting member 69. The first tendon member 95 is shown passing through a first opening 103 and extending around first vertical shaft portion 108.

As will be discussed in more detail in FIGS. 9A and 9B, a tension release mechanism 255 comprises a second rotatable splined column 268 and a second rotatable second column 262 which are mounted on a platform 290 and rotatably coupled to first vertical shaft 108. The lateral separation between the second splined column 268 and the second rotatable second column 262 is less than the sum of their radii. The tension release mechanism 255 protects the first tendon member 95 from breaking due to the collar 80 being physically forced to rotate when the first rotatable motor shaft 96 of the first motor 18 is either stationary, or rotating in the direction opposing that of the induced force, as will be further discussed in respect of FIGS. 9A and 9B.

The microcontroller 114 is mounted on an electrical circuit board 110 and receives position movement instruction frames from the motor control interface 46 via an electrical connection 118 connected to an electrical connector 117 mounted on the electrical circuit board 110. It will be appreciated that the position movement instruction frames from the motor control interface 46 may be transmitted to the electrical circuit board by any suitable communications means, such as a direct link, an RS232 serial link, USB or wireless link. The microcontroller 114 processes the received movement instruction frames for the purpose of controlling the movement direction and magnitude of the collar 80 and neck 72 by means of motors 18 and 22 respectively.

The neck 72, further comprises a pair of cylindrically shaped securing members 142 (only one shown in FIG. 3A) for rotatably connecting the neck 72 to a pair of retaining slots 131 (only one shown) located at the upper securing portion 81 of the collar member 80. The neck 72 rotatably tilts relative to a pivot point, wherein the pivot point is defined by the engagement of the pair of cylindrically shaped securing members 142 on the neck 72 with each pair of retaining slots 131.

As the neck 72 tilts about the pivot point, it has a second plane of rotation 122 about a second rotation axis, as defined by 120. The pan movement of the collar 80 relative to the tilt movement of the neck 72 is such that the second rotation axis, as defined by 120, of the neck 72, rotates about the first fixed rotation axis, as defined by 125, of the collar 80. In the current embodiment of the present invention, the first fixed plane of rotation, as defined by 127, of the collar 80 and the second plane of rotation, as defined by 122, of the neck 72 are perpendicular. The tilt movement of the neck 72 defines the tilt movement of the position manipulating mechanical structure 70.

The first motor 18 comprises a first rotatable motor shaft member 96 and the second motor 22 comprises a second rotatable motor shaft member 98. Both motors 18, 22 are stationary with respect to the neck 72 and collar 80 and are connected to the under surface 102 of the mounting member 100 by means of a second set of four securing screws 104 (only two are shown). The first motor shaft member 96 of the first motor 18 has a third rotation axis (not shown) which is longitudinally concentric with the first motor shaft member 96. Similarly, the second motor shaft member 98 of the second motor 22 has a fourth rotation axis (not shown) which is longitudinally concentric with the second motor shaft member 98. Both motors 18, 22 have been secured to the mounting member 100, wherein the mounting member 100 is stationary relative to the rotatable neck and collar member 72, 80.

The third rotation axis of the first motor shaft 96 and the fourth rotation axis of the second shaft 98 are stationary and fixed relative to each other. Therefore, each motor 18, 22 independently provides pan and tilt movement for the collar 80 and neck 72 without for example the first motor 18 carrying the mass or load of the second motor 22. Consequently, the mounting position of the motors (18 and 22) is such that neither the first motor 18 providing pan movement nor the second motor 22 providing tilt movement carries the mass or load of the other motor (18 or 22).

A first tendon member 95 couples the rotational movement of the first motor shaft member 96 to the collar member 80 which in turn causes the collar 80 to rotate about the first vertical shaft portion 108. The first tendon member 95 comprises a first segment and a second segment, where each segment has a first end and a second end. At the first end, the first segment of the first tendon 95 is attached to the circumference of the first motor shaft member 96. Similarly, at the first end, the second segment of the first tendon 95 also attaches to the circumference of the first motor shaft member 96.

Consequently, at the first end, the first and second segments of the first tendon member 95 form a loop around the first motor shaft 96. As the tension on the first end of the first tendon 95 increases due to the first motor shaft 96 rotating, the attachment of the first and second segments to the first shaft member 96 avoids any slipping of the first tendon 95 relative the first motor shaft 96. It will be appreciated that in accordance with the present invention, the first tendon member 95 is defined as a segment of string, cord, rope, wire or other filament that under pulling tension at one end can cause movement at the other.

The collar member 80 further comprises a second vertical shaft portion 84 located near the base of the collar 80, wherein the second vertical shaft portion 84 receives the second end of the first tendon member 95 for coupling the first motor shaft 96 rotation to the collar 80. The first vertical shaft 108 is concentric with the second vertical shaft 84, wherein the second vertical shaft 84 rotates about the first vertical shaft 108.

At the second end, the first segment of the first tendon 95 is attached to a fixed point (not shown) on the circumference of the second vertical shaft portion 108 of the collar member 80. Also, at the second end, the second segment of the first tendon 95 is attached to a fixed point (not shown) on the circumference the second vertical shaft portion 108. Consequently, at the second end, the first and second segments of the first tendon member 95 form a loop around the second vertical shaft portion 108. As the tension on the second end of the first tendon 95 increases due to the first motor shaft 96 rotating, the attachment of the first and second segments to the second vertical shaft portion 108 avoids any slipping of the first tendon 95 relative the second vertical shaft portion 108. The first tendon member 95 passes through a first opening 103 in the mounting member 100 when connected between the first motor shaft member 96 and the second vertical shaft portion 108 of the collar 80. By connecting the first tendon 95 between the first motor shaft member 96 of the first motor 18 and the second vertical shaft portion 108 of the collar member 80, the rotation of the first motor shaft member 96 is coupled through the first tendon 95 to the second vertical shaft portion 84 causing the pan movement of the collar 80.

Clockwise rotational movement of the first motor shaft 96, as defined by directional arrow B, is transferred through the first tendon 95 to the collar member 80, causing the first tendon 95 to rotate or pan the collar 80 in a clockwise motion, as defined by directional arrow B'. Conversely, anti-clockwise movement of the first shaft 96 is transferred through the first tendon 95 to the collar member 80, causing the first tendon 95 to rotate or pan the collar 80 in an anti-clockwise motion. The first fixed plane of rotation, as defined by 127, of the collar 80 rotates about the first fixed rotation axis, as defined by 125, wherein the first fixed rotation axis, as defined by 125, is referred to as the major rotation axis. Hence, in accordance with the present invention, the major rotation axis which occurs due to the pan movement is fixed.

A second tendon member 99 couples the rotational movement of the second motor shaft member 98 to the neck 72, which in turn causes the neck 72 to tilt about the pivot point 142 defined by the engagement of the neck 72 with each pair of retaining slots 131.

The second tendon member 99 comprises a first end, a central portion, and a second end located at the opposite end to the first end. At the first end, the second tendon 99 is attached to the circumference of the second motor shaft member 98. Similarly, the second end of the second tendon 99 also attaches to the circumference of the second motor shaft member 98. The length of tendon between the two end points is extended from the second motor shaft 98 to the neck member, where the central portion of the tendon 99 is attached to the neck 72 by means of a first slit region 74 and a second slit region 76 located at opposing positions on the body of the neck 72. A cavity region within the hemispherical shaped neck 72 provides a means for passing the central portion of the second tendon member 99 through the neck 72. The central portion of the second tendon member 99 is passed through the hollow region of the neck 72 by passing between the first and second slit region 74, 76 (for a clearer illustration of one of the slit regions, refer to FIG. 7).

Consequently, the first end and second end of the second tendon member 99 form a loop around the second motor shaft 98 and the neck 72. As the tension on the first and second end of the second tendon 99 increases due to the second motor shaft 98 rotating (clockwise and anti-clockwise), the attachment of the first and second ends to the second shaft member 98 avoids any slipping of the second tendon 99 relative the second motor shaft 98. It will be appreciated that in accordance with the present invention, the second tendon member 99 is defined as a segment of string, cord, rope, wire or other filament that by applied tension at one end can cause movement at the other.

Figure 7:
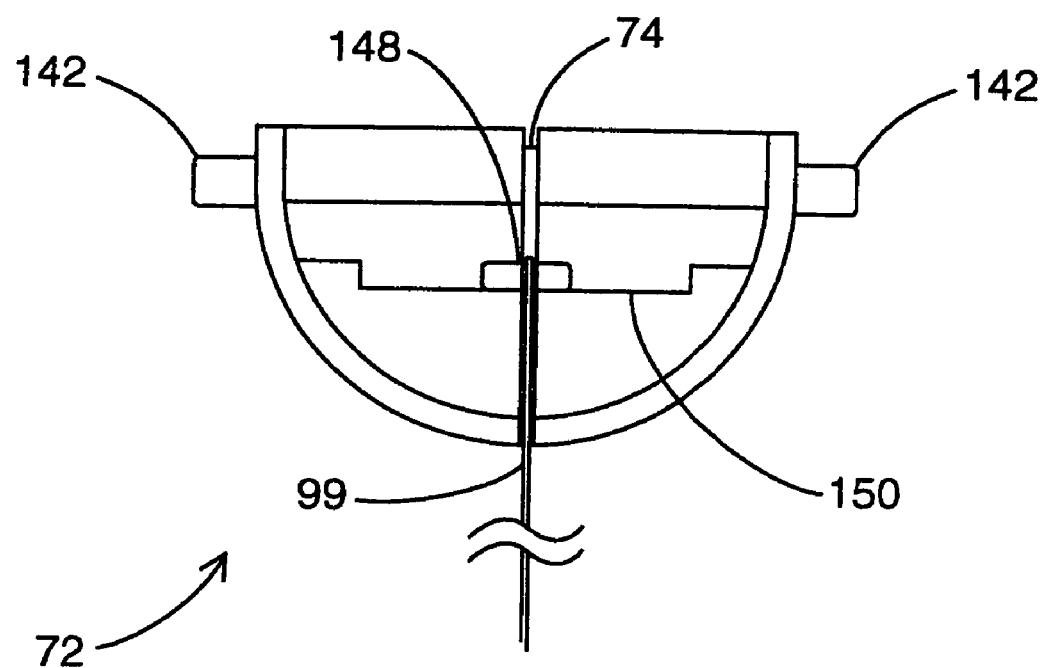
FIG. 7 is a cross sectional view of the neck member of the image tracking system of FIG. 1.

Referring to FIG. 7, the second tendon 99 is placed within each slit region 74 (only 74 shown) and pushed to the base location 148 of the slit 74, where the second tendon rests against the body of the neck as it exits the neck towards the second shaft member 98.

As illustrated in FIG. 3A, a hollow bore region within the first vertical shaft 108 provides a channel for passing the second tendon 99 between the second motor shaft 98 and the neck 72. The second tendon member 99 passes through a hollow region of the neck 72 and exits the neck 72 at the first and second slit region 74, 76 locations.

Both portions of the second tendon 99 exiting the slit regions 74, 76 pass through a second opening 86 (also see FIG. 9A) at the top portion of the collar member 80 and a third annular opening 109 in the first vertical shaft 108 before connecting to the second motor shaft member 98 by means of the hollow bore of the first vertical shaft 108. The rotation of the second motor shaft member 98 is coupled through the second tendon member 99 to the first or second slit region 74, 76 causing the tilt movement of the neck 72 about the pair of pivotal points, defined by the engagement of the pair of cylindrically shaped securing members 142 (only one shown) on the neck 72 with each pair of retaining slots 131.

Clockwise rotational movement of the second motor shaft 98, as defined by directional arrow C, is coupled through the second tendon 99 to the first slit region 74 on the neck 72, causing an applied downward tension force on the first slit region 74. This subsequently causes tilt movement of the neck 72 about the pair of pivotal points, defined by the engagement of the pair of cylindrically shaped securing members 142 on the neck 72 with each pair of retaining slots 131. Directional arrow C' shows the direction of tilt movement for the neck as a result of the clockwise rotation of the second motor shaft 98. Conversely, anti-clockwise movement of the second motor shaft 98 is coupled through the second tendon 99 to the second slit region 76 on the neck 72, causing an applied downward tension force on the second slit region 76. This causes tilt movement of the neck 72 about the pair of pivotal points in an opposing direction of rotation to that indicated by directional arrow C'.

The second plane of rotation, as defined by 122, of the neck 72 rotates about the second rotation axis, as defined by 120, wherein the second axis of rotation is referred to as a minor rotation axis. Hence, the minor rotation axis which occurs as a result of the tilt movement rotates about the fixed major rotation axis which occurs due to the pan movement.

In accordance with a preferred embodiment of the present invention, the position of the first and second tendons 95, 99 are configured so that the respective pan and tilt movements do not apply additional unwanted tension on either tendon member (95 or 99). In other words, the movement of both the first tendon 95 and second tendon 99 are mutually independent of one another and neither rotatable member (neck 72 and collar member 80) affects the other's movement. This is achieved by connecting the second tendon 99 in an approximately straight line path between the second motor shaft 98 and the neck 72, whereby the second tendon is oriented so that a substantial portion of the second tendon is aligned with the stationary first rotation axis. As the first tendon member 95 provides pan movement, the minor axis of rotation corresponding to the tilt movement rotates about the second tendon member 99. Therefore, no unwanted additional tension is applied to the second tendon 99 as a result of the pan movement about the major axis of rotation.

By connecting a tendon which provides a minor axis of rotation, in a straight line between its motor shaft and movement actuating member (e.g. neck member or wheel mechanism), such that movement about a major axis of rotation (e.g. pan movement) causes the minor axis to rotate about the tendon corresponding with the minor axis, the movement about the major axis will not affect movement about the minor axis.

As shown in FIG. 3A, the camera support member 75 comprises a base surface 77 and a ¼ inch camera mounting screw 79, wherein the screw 79 engages a corresponding standard ¼ inch thread that exists on most camera bodies. The base surface 77 supports the body of the camera, once the mounting screw 79 of the camera support member 75 is fully screwed into the thread (not shown) on the camera body.

Figure 6A:
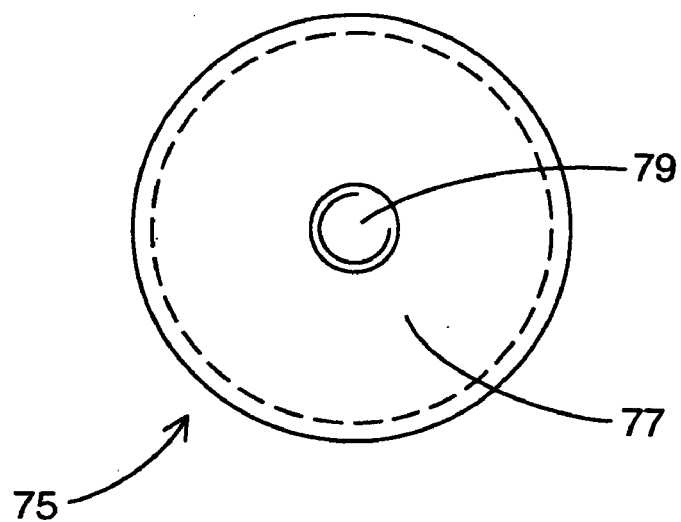
FIG. 6A is a top view of the camera support member of the image tracking system of FIG. 1
Figure 6B:
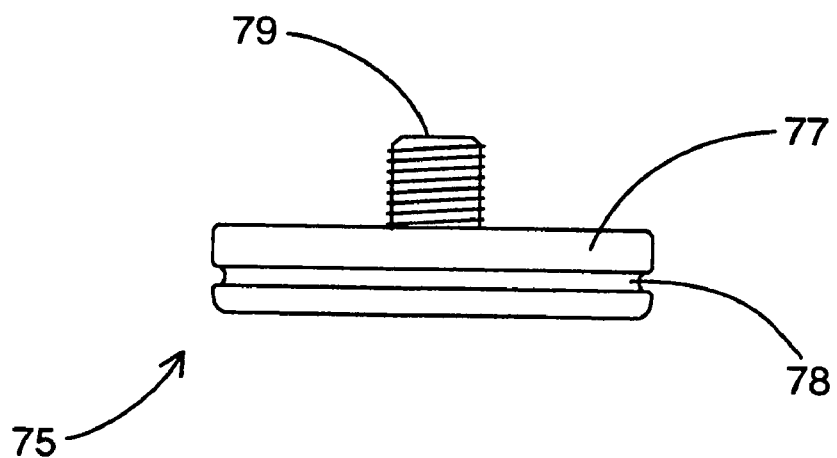
FIG. 6B is a side view of the camera support member of the image tracking system of FIG. 1

FIGS. 6A and 6B show two alternative views of the camera support member 75 from the side and above, respectively. The view from above shows the annular shape of the base surface 77, which supports the body of the camera 16 once the camera 16 is attached to the camera support member 75. The camera support member also includes a groove region 78 along its annular outer rim for snap fitting into the annular inner rim 126 (see FIG. 3) of the neck 72.

Figure 4B:
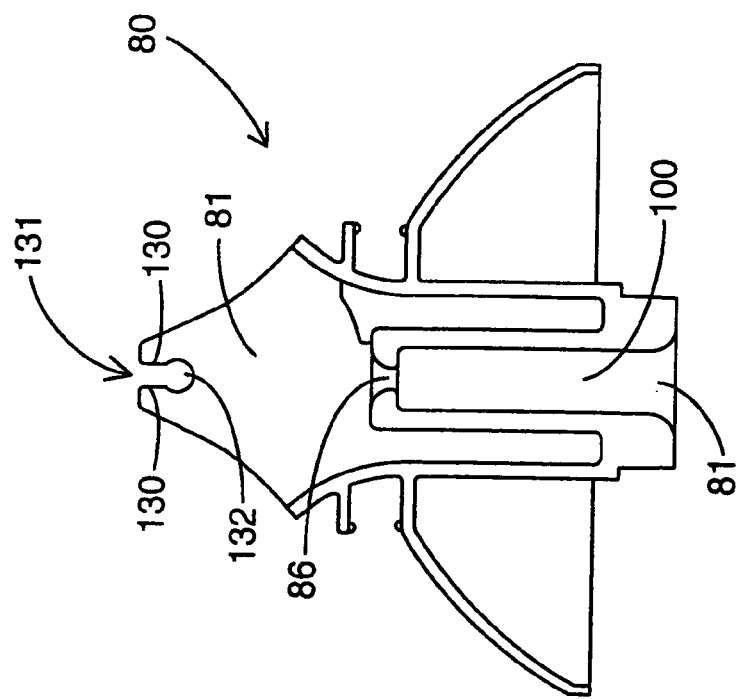
FIGS. 4A and 4B are cross-sectional views of the collar member of the image tracking system of FIG. 1.
Figure 4A:
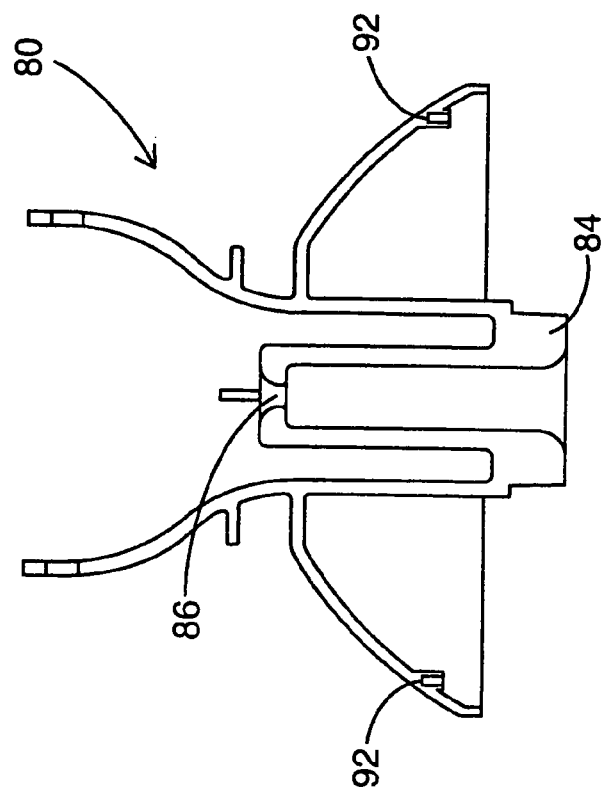
Figure 5A:
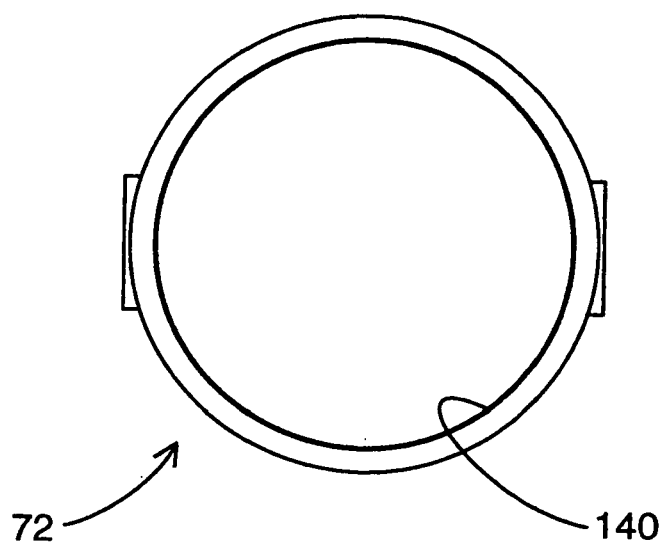
FIG. 5A is a top view of the neck member of the image tracking system of FIG. 1.
Figure 5B:
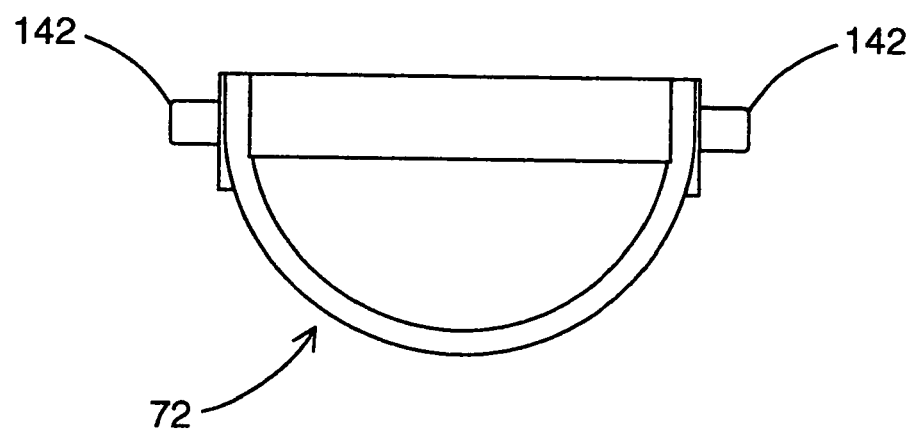
FIG. 5B is a side view of the neck member of the image tracking system of FIG. 1.

FIG. 4 illustrates the pair of retaining slots 131 of the collar member 80 (only one shown) located at its upper securing portion 81, wherein the pair of retaining slots 131 pivotally hold the neck 72 in place. FIG. 5 shows a perspective view from the top and side of the neck 72. The side view shows the pair of cylindrically shaped contact members 142 for engaging the pair of retaining slots 131 of the collar 80 (illustrated in FIG. 4). Each of the retaining slots 131 comprises a channel opening between two vertical support walls 130, wherein the walls 130 terminate above a circular recess 132. The width of the channel between the walls 130 is slightly smaller than the diameter of each pair of the cylindrically shaped contact members 142 (as shown in FIG. 5B). The diameter of the circular recess 132 is approximately the same as the pair of contact members 142.

As the pair of cylindrically shaped contact members 142 are pushed into the pair of retaining slots 131, the width of channel opening (one for each retaining member) increase to accommodate the contact members 124. As the contact members 142 are pushed past the channel regions and into each recess area 132, the width of each channel opening returns to its original width. The diameter of the contact members 142 are larger than each channel opening width and therefore, the channel opening closes around the upper surfaces 126 of the contact members 142 (see FIG. 5) as they are pushed into each recess areas 132. The diameter of the contact members 142 and each recess area 132 are such that the frictional contact between the two (contact members and recess area) provides sufficient securing of the neck 72 to the collar 80 without restricting the pivotal or tilt movement of the neck 72.

Figure 8A:
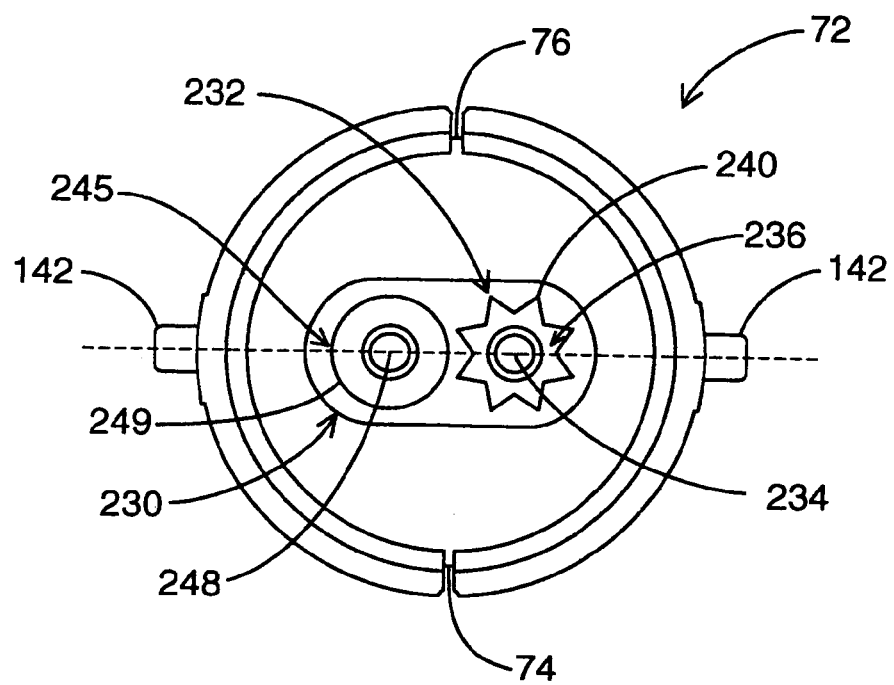
FIGS. 8A and 8B are top views of the tension release mechanism installed in the neck member of the image tracking system of FIG. 1.

FIG. 8A is a top view of the neck 72, whereby a tension release mechanism 230 is mounted within the hollow region of the neck 72. The purpose of a tension release mechanism is to avoid a tendon breaking as a result of forcibly rotating any rotatable members such as the neck or collar 72, 80 in a direction opposing the corresponding motor's torque.

It will be appreciated that forcible rotation of a rotatable member in this way can overcome the tensile strength of a tendon. The tension release mechanism 230 protects the second tendon member 99 from breaking due to the neck 72 being physically forced to tilt when the second motor shaft 98 of the second motor 22 is either stationary (i.e. not rotating), or rotating in the direction opposing that of the physically induced force. This is particularly useful, when users of the system may be of a younger age group and more inclined to curiously try and force the neck 72 to tilt without the motor controlling the tension of the tendon member and consequently the neck 72 movement.

The tension release mechanism 230 comprises a rotatable splined column 232 having a first radius, and a rotatable second column 245 having a second radius. The second radius of the second column 245 is defined as the distance from the center 248 of a circular cross section (e.g. top surface of column as shown in FIG. 8A) of the second column 245 to the circumference of the circular cross section 249.

The rotatable splined column 232 has a plurality of spline members 236 extending along its length, wherein each of the spline members 236 on the splined column 232 has an end portion 240. The first radius of the splined column 232 is defined as the distance from the center 234 of the splined wheel 232 to the tip portion 240 of each spline member 236.

Both columns 232 and 245 are rotatably mounted on a platform (see FIG. 7 reference number 150) such that the lateral separation between the centers 234, 249 of both columns is slightly less than the sum of both the first radius of the splined column 232 and the second radius of the second column 245. Therefore, as the splined column 232 rotates, a spline member 236 will engage the second column 245 and restrict the rotation movement of the splined column 232. The outer layer of the second column 245 is made of an elastic type material such as rubber or plastic.

Consequently, if the spline column 232 is rotated with enough torque, the spline member 236 will compress and momentarily deform the outer layer (e.g. rubber or plastic) of the second column 245 causing the spline member 236 to rotate. Once the spline member 236 passes the second column 245, the portion of the outer layer which engaged the spline member 236 returns to its original shape. If the rotation torque applied to the splined column 232 is beyond a finite torque value, each of the spline members will forcibly rotate past the second column 245. Therefore, the splined column 232 will rotate in discrete steps, wherein each discrete step is defined by the distance between each of the spline members 236. The columns 232, 245 protect the second tendon 99 from excessive tension and the possibility of breaking, as described in the following paragraph.

Figure 8B:
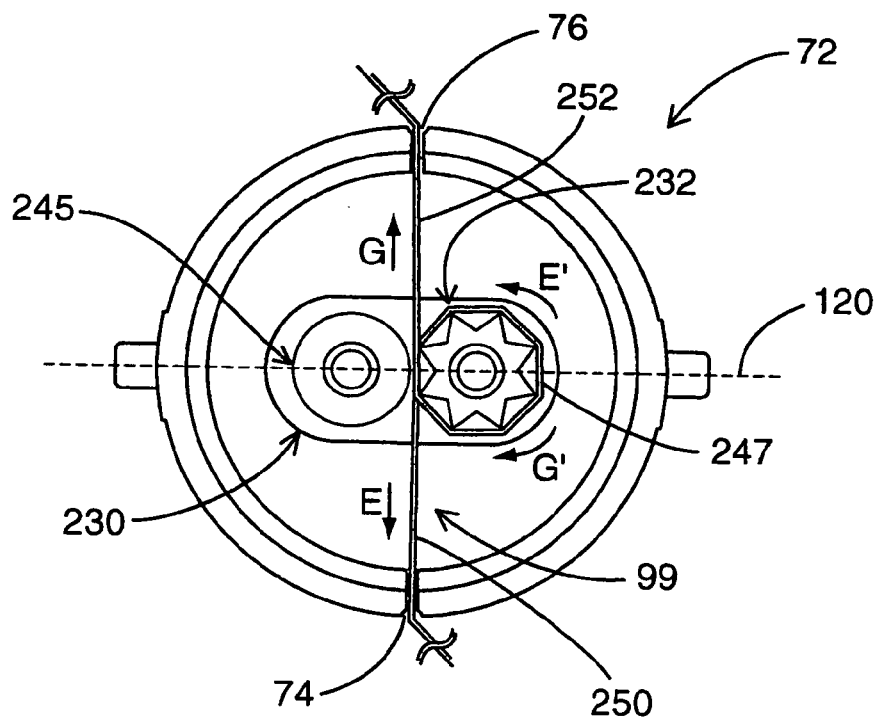

FIG. 8B is a top view of the second tendon member 99 attached to the neck 72 and tension release mechanism 230. As previously described, the second tendon 99 passes through the first slit region 74 and the second slit region 76 located at opposing positions on the body of the neck 72. However, instead of attaching the second tendon 99 to provide a taut connection between the first slit region 74 and a second slit region 76, a slack portion 247 of the second tendon 99 is provided, wherein the slack portion 247 is wrapped around the splined column 232 located between the slit regions 74, 76. A first portion 250 of the second tendon 99 extends from the splined column 232 through the first slit region 74 and connects to the second motor shaft 98. A second portion 252 of the second tendon 99 extends from the splined column 232 through the second slot region 76 and connects to the second motor shaft 98.

Under normal operation, the second motor shaft 98 of the second motor 22 rotates in a first direction and causes the neck 72 to pivot about the second rotation axis 120. The second tendon 99 applies a downward tension on the first slit 74 and releases the tension from the second slit 76 causing the neck 72 to tilt. Similarly, the second motor shaft 98 of the second motor 22 rotates in a second direction causing the second tendon 99 to apply a downward tension on the second slit 76, which releases the tension from the first slit 74 and causes the neck 72 to tilt in the opposite direction.

If a user physically forces the neck 72 to tilt without operating the motors 18, 22, the excess tension may cause the second tendon 99 to break. With the tension release mechanism 230 in place, the forced tilting action causes the first portion 250 of the second tendon member 99 to experience an increased tension along the direction of arrow E, whilst the second portion 252 of the second tendon member 99 experiences a released tension along the direction of arrow G. This in turn causes the slack portion 247 of the second tendon member 99 wrapped around the splined column 232, to try and rotate the splined column 232 in a counter clockwise direction, as defined by arrow E'. If the tension on the first portion 250 of the second tendon 99 along the direction of arrow E is in excess of a finite limit, each of the spline members 236 of the splined column 232 will forcibly rotate past the second column 245, causing the splined column 232 to rotate in the counter clockwise direction, as defined by arrow E'. As the splined column 232 rotates, the slack portion 247 of the second tendon 99 is progressively unwrapped from the splined column 245 as forcible tilting of the neck 72 continues. This results in a reduced tension on the first portion 250 of the second tendon 99 along the direction of arrow E, thus avoiding breaking the second tendon 99.

Similarly, if the forced tilting action causes the second portion 252 of the second tendon member 99 to experience an increased tension along the direction of arrow G, whilst the first portion 250 of the second tendon member 99 experiences a released tension along the direction of arrow E. This in turn causes the slack portion 247 of the second tendon member 99 wrapped around the splined column 232, to try and rotate the splined column 232 in a clockwise direction, as defined by arrow G'. If the tension on the second portion 252 of the second tendon 99 along the direction of arrow G is in excess of a finite limit, each of the spline members 236 of the splined column 232 will forcibly rotate past the second column 245, causing the splined column 232 to rotate in the counter clockwise direction, as defined by arrow G'. As the splined column 232 rotates, the slack portion 247 of the second tendon 99 is progressively unwrapped from the splined column 245 as forcible tilting of the neck 72 continues. This results in a reduced tension on the second portion 252 of the second tendon 99 along the direction of arrow G, thus avoiding breaking the second tendon 99.

Referring back to FIGS. 3A and 3B, it will also be appreciated that the body of the collar member 80 prevents forcible tilting of the neck 72 beyond absolute rotational limits.

Figure 9A:
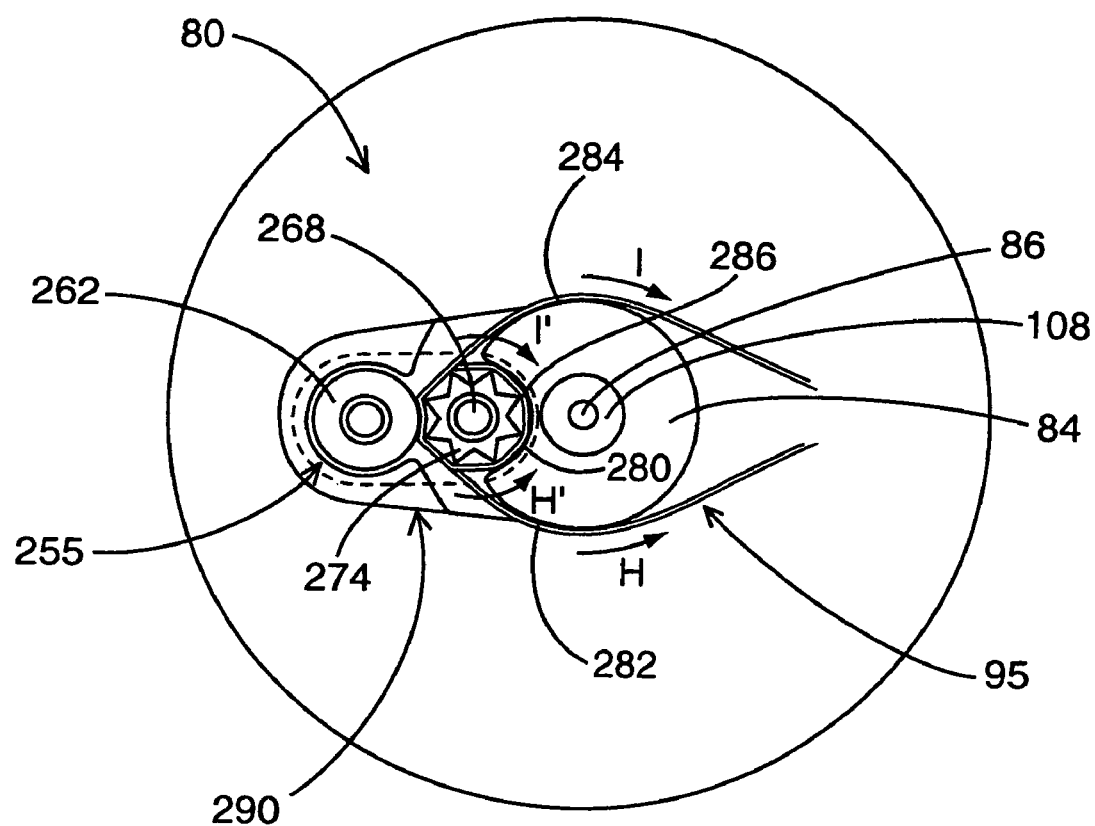
FIGS. 9A and 9B are bottom views the tension release mechanism installed within the collar member of the image tracking system of FIG. 1.
Figure 9B:
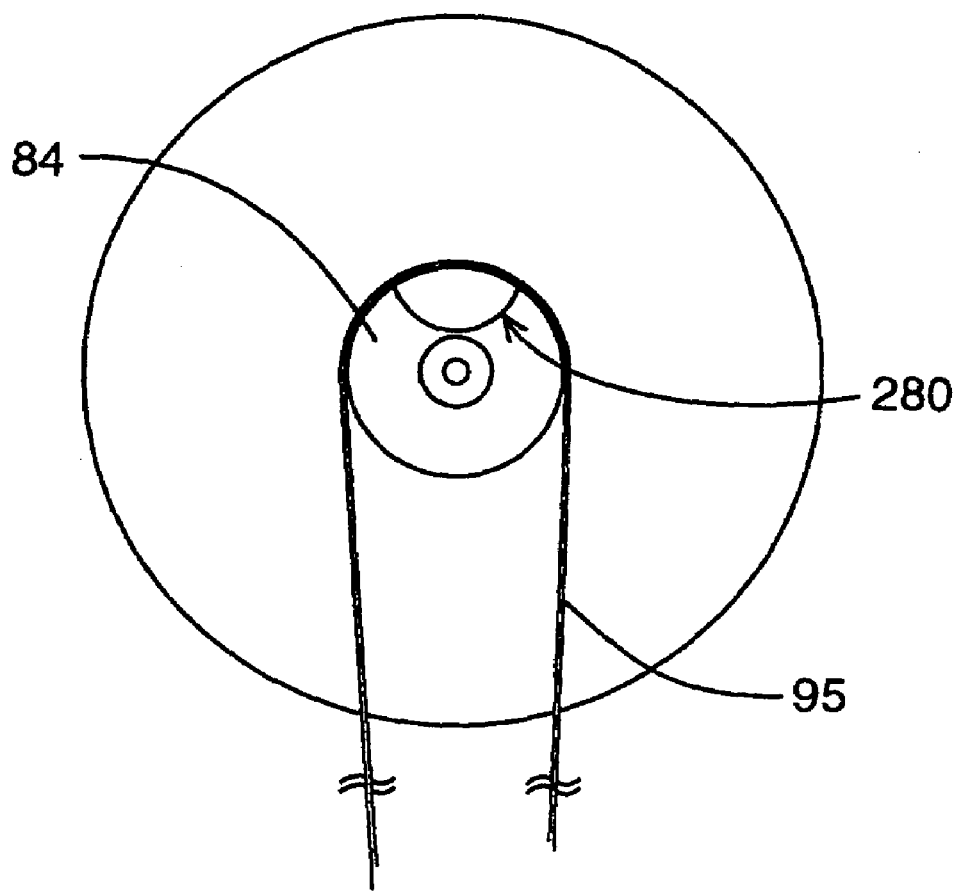

FIG. 9A is a second tension release mechanism 255 identical in operating principle and mechanical structure to the tension release mechanism 230 shown in FIGS. 8A and 8B and as previously shown in FIG. 3B. The tension release mechanism 255 protects the first tendon member 95 from breaking due to the collar 80 being physically forced to rotate when the first rotatable motor shaft 96 of the first motor 18 is either stationary (i.e. not rotating), or rotating in the direction in the direction opposing that of the induced force. This is particularly useful when users of the system may be of a younger age group and more inclined to curiously try and force the collar 80 to rotate without the motor controlling the tension of the tendon member and consequently the collar 80 movement.

The second tension release mechanism 255 comprises a second rotatable splined column 268 and a second rotatable second column 262, where the lateral separation between the second splined column 268 and the second rotatable second column 262 is identical to that of columns 245 and 232 shown in FIGS. 8A and 8B. The rotatable splined column 232 has a plurality of spline members 274 extending along its length.

As shown in FIG. 9A, the second rotatable splined column 268 is placed within a semi-circular recess 280 (also see FIG. 9B) near the base of the second vertical shaft 84 of collar 80. Both columns 268 and 262 are rotatably mounted on a platform 290, wherein the platform 290 connects to the second vertical shaft 84. Therefore, as the second vertical shaft 84 of collar 80 rotates, so does the second tension release mechanism 255. FIG. 9B is a cross-sectional top view of the second vertical shaft 84 and first tendon 95 without the second tension mechanism 255 in place. As previously described and illustrated in both FIGS. 9B and 4, the first tendon 95 is both attached to a fixed point on the circumference of the second vertical shaft member 84 and wrapped around it. By including the tension release mechanism 255, as shown in FIG. 9A, a second slack portion 286 of the first tendon 95 is provided, wherein the slack portion 286 is wrapped around the splined column 268 located in the semi-circular recess 280 of the second vertical shaft 84. A first portion 282 of the first tendon 95 extends from the splined column 268 and passes around its circumference and connects to the first motor shaft 96. A second portion 284 of the first tendon 95 also extends from the splined column 268 and passes around part of the circumference of the vertical shaft member before connecting to the first motor shaft 96.

Under normal operation, the first motor shaft 96 rotates in a first direction and causes the collar 80 to rotate about the first vertical shaft 108 of the mounting member 100. As the first motor shaft 96 rotates, the first tendon 95 applies an increased tension on the second vertical shaft 84 of collar 80 in the direction indicated by arrow I, whilst the tension on the second vertical shaft 84 in the direction of arrow H is reduced. Consequently, the second vertical shaft 84 rotates the collar 80 in a clockwise rotational direction. Similarly, when the first motor shaft 96 of the first motor 18 rotates in a second direction, the first tendon 95 applies an increased tension on the second vertical shaft 84 of collar 80 in the direction indicated by arrow H, whilst the tension on the second vertical shaft 84 of collar 80 in the direction of arrow I is reduced. Consequently, the second vertical shaft 84 rotates the collar 80 in an opposite anti-clockwise rotational direction.

If the user physically forces the collar 80 to rotate without operating the motors 18, 22, the excess tension may cause the first tendon 95 to break. With the second tension release mechanism 255 in place, the forced rotation action causes the first portion 282 of the first tendon member 95 to experience an excess tension along the direction of arrow H, whilst the second portion 284 of the first tendon member 95 experiences a released tension along the direction of arrow I. This in turn causes the slack portion 286 of the tendon member 95 wrapped around the splined column 268 to try and rotate the splined column 268 in a counter clockwise direction, as defined by arrow H'. If the tension on the first portion 282 of the first tendon 95 along the direction of arrow H is in excess of a finite limit, each of the spline members 274 of the splined column 268 will forcibly rotate past the second rotatable second column 262, causing the second splined column 268 to rotate in the counter clockwise direction, as defined by arrow H'. As the second splined column 268 rotates, the slack portion 286 of the first tendon 95 is progressively unwrapped from the splined column 268 as forcible rotation of the collar 80 continues. This results in a reduced tension on the first portion 282 of the first tendon 95 along the direction of arrow H, thus avoiding breaking the first tendon 95.

Similarly, if the forced rotation action causes the second portion 284 of the first tendon member 95 to experience an excess tension along the direction of arrow I, the first portion 282 of the first tendon member 95 will experience a released tension along the direction of arrow H. This in turn causes the slack portion 286 of the tendon member 95 wrapped around the splined column 268 to try and rotate the splined column 268 in a clockwise direction, as defined by arrow I'.

If the tension on the second portion 284 of the first tendon 95 along the direction of arrow I is in excess of a finite limit, each of the spline members 274 of the splined column 268 will forcibly rotate past the second rotatable second column 262, causing the second splined column 268 to rotate in the clockwise direction, as defined by arrow I'. As the second splined column 268 rotates, the slack portion 286 of the first tendon 95 is progressively unwrapped from the splined column 268 as forcible rotation of the collar 80 continues. This results in a reduced tension on the second portion 284 of the first tendon 95, along the direction of arrow I, thus avoiding breaking the first tendon 95.

FIGS. 10A and 10B are perspective views of a tendon motor pulley 299 which includes a lower tendon wheel 300 (FIG. 10C) and an upper tendon wheel 302 (FIG. 10D). Tendon motor pulley 299 is a relatively simple assembly which can be used to secure two opposing tendons 310 and 312 (FIGS. 11A and 11B) easily and securely.

Specifically, FIG. 10C shows a lower tendon wheel 300 which comprises a disk 301 from which extends two columns 304, within which are formed two recesses 306 and a central recess 308. FIG. 10D shows an upper tendon wheel 302 which comprises a disk 321 from which extends two columns 320, within which are formed two recesses 322 and an extending central hub 324. As can be understood, columns 304, 320 and recesses 306, 322 of upper and lower tendon wheels 300 and 302 are formed so that when lower tendon wheel 300 is coupled to upper tendon wheel 302, the columns 304 are received in a precision fit within recesses 322 and columns 320 are received in a precision fit within recesses 306. Further, the central recess 308 is formed so as to receive central hub 324 in a precision fit.

Disk 301 of lower tendon wheel 300 has a knurled hole 330 which is adapted to receive a motor shaft (not shown). Disk 321 of upper tendon wheel 302 has a bore 332 which is adapted to receive a securing screw (not shown). A securing screw can be used to secure the tendon motor pulley 299 to a motor shaft (not shown). In this way, the tendon motor pulley 299 guides the tendon segment 310 or 312 around a substantially circular path concentric with the attached motor shaft. This ensures the tendon displacement is proportional to the angle of the motor shaft rotation. Likewise, at the other end of the tendon 310 or 312, a substantial circular tendon segment path centered around the actuating member's rotational axis further ensure the angle of motor shaft rotation is proportional to the actuated member's rotational angle.

Figure 11A:
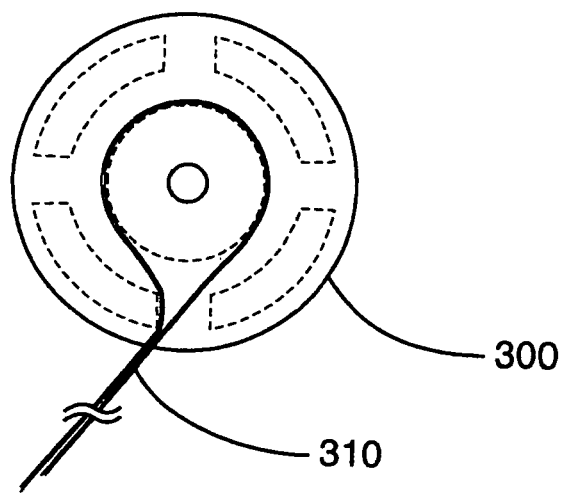
FIGS. 11A and 11B are cross-sectional views of the assembled tendon motor pulley, shown engaged by a tendon.
Figure 11B:
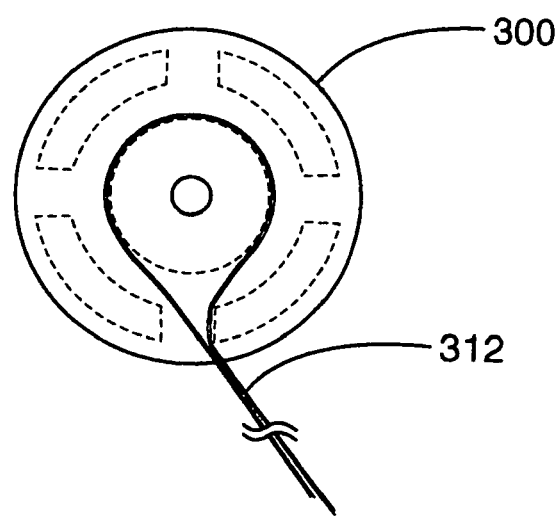

FIGS. 11A and 11B show how two opposing segments of a tendon 310 and 312 can be secured within tendon motor pulley 299. In use, tendons 310 and 312 can be looped around central hub 324 and then upper and lower tendon wheels 300 and 302 can be coupled together so that the columns 304 are received in a precision fit within recesses 322 and columns 320 are received in a precision fit within recesses 306. Most importantly, the central recess 308 is formed so as to receive central hub 324 in a precision fit. A securing screw is then used to secure upper and lower tension wheels 300 and 302 together and to the motor shaft (not shown). It should be noted that the tendons 310 and 312 are double-threaded for added strength.

Image Tracking Software

Figure 12:
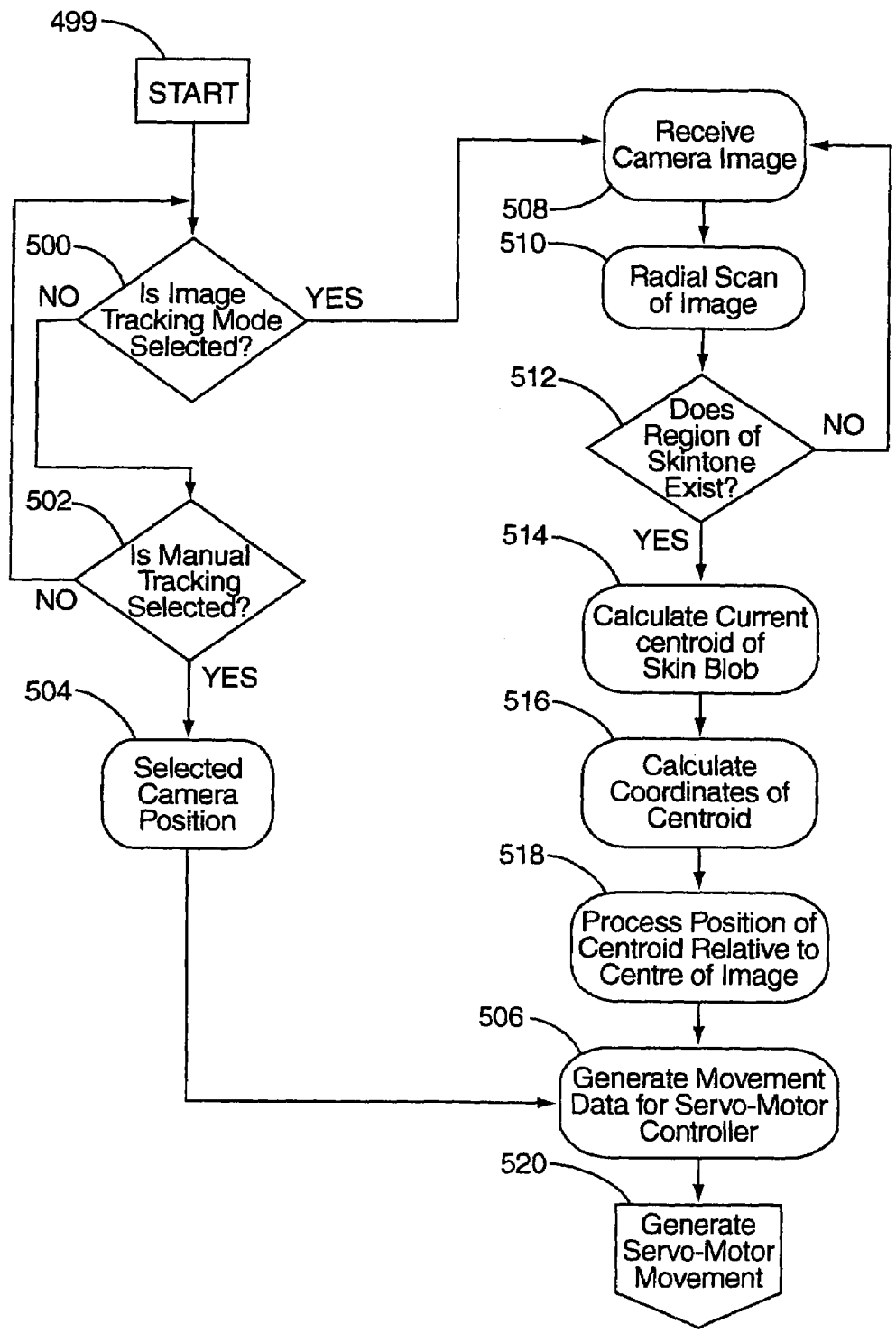
FIG. 12 is functional flow diagram illustrating the functionality of the image tracking program of the image tracking system of FIG. 1.

The operation of the image tracking program (software and microcontroller firmware) is illustrated in the flow diagram of FIG. 12. The general principles of the image tracking program are related to concepts discussed in the research paper authored in part by the applicant entitled "An active stereo vision system for recognition of faces and related hand gestures", R. Herpers, G. Verghese, L. Chang, K. Darcourt, K. Derpanis, R. F. Enenkel, J. Kaufman, M. Jenkin, E. Milios, A. Jepson and J. K. Tsotsos, Proc. of 2nd Int. Conf. on Audio- and Video-based Biometric Person Authentication, University of Maryland, USA, March, 1999, pp. 211–216.

The process starts when the user activates image tracking system 10 at step 499. At step 500 and 502 the user selects the image tracking mode or the user positioning, as previously discussed. In user positioning, the user uses an appropriate pointing device (e.g. computer mouse or trackball) to position the digital video camera so that it displays a desired image on the computer screen or monitor. In contrast, in image tracking mode, the image of a human subject is continuously tracked by the digital video camera using the skintone tracking algorithm. As the subject moves, the camera automatically tracks the subject's movement and displays the image on the screen or monitor.

Figure 14:
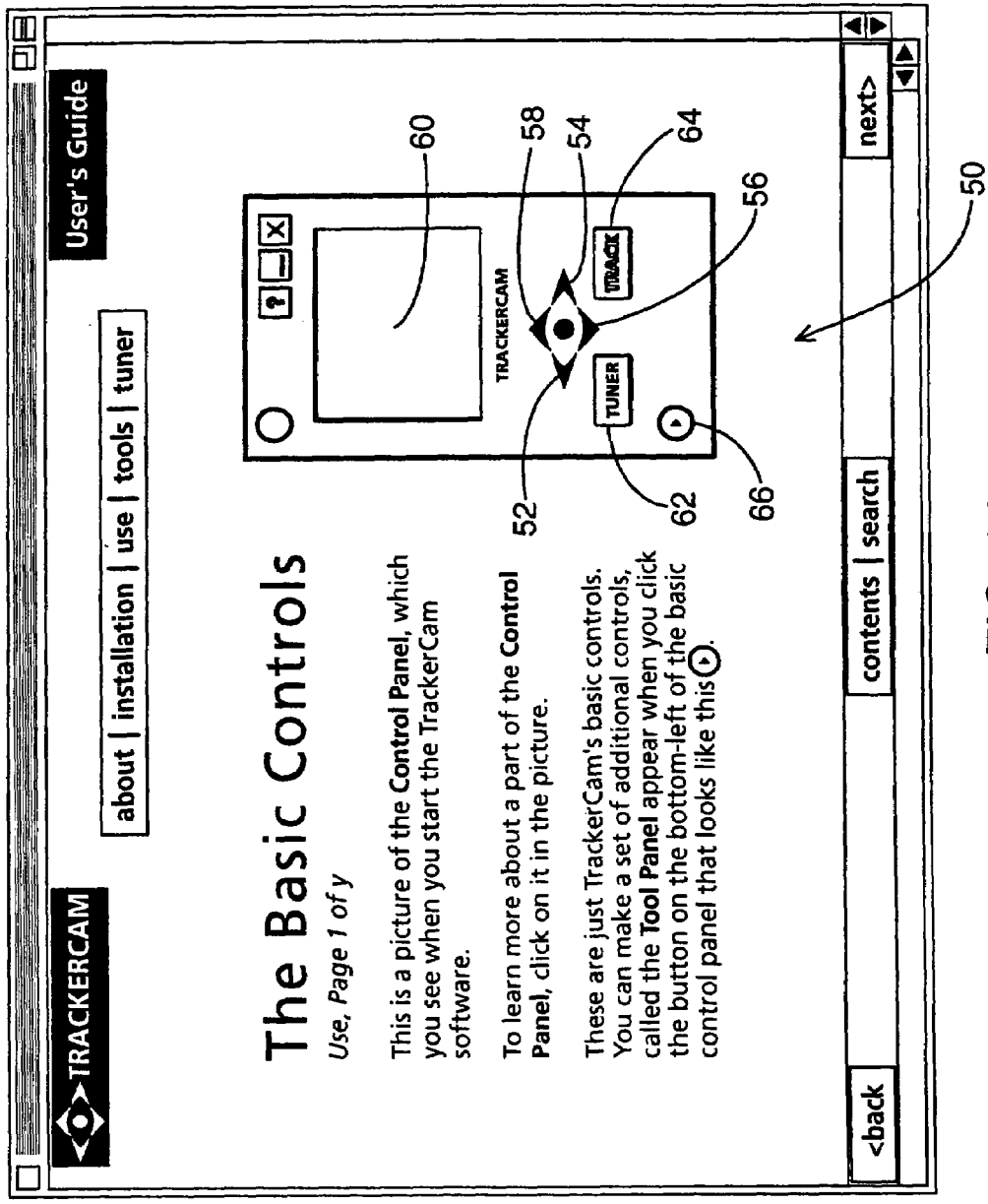
FIG. 14 is a screen capture of the CONTROL SCREEN™ user interface generated by the user interface software of the image tracking system of FIG. 1.

Now referring to FIGS. 12 and 14, in a step 504 the user may select any desired camera position, wherein the user control screen 50 (see FIG. 14) allows the user to select a desired camera pointing position by selecting the left arrow button 52, right arrow button 54, up arrow button 58 and down arrow button 56. Alternatively, the user may click any point in the displayed image frame to direct the camera to center that point. In a step 506, each time the arrow buttons (52, 54, 56, 58) are clicked on (e.g. by a mouse) or an arrow key if pressed on the keyboard, a position movement instruction frame is generated for the purpose of providing camera movement in the direction of the arrow button clicked on. Continuous movement occurs while the button or key is pressed. In a step 520, the movement instruction frames corresponding to the activated (pressed or clicked on) arrow buttons (52, 54, 56, and 58 as shown in FIG. 14) are converted to specific pulse width modulated (PWM) signals which generate the movement of the motors 18, 22.

Each time a particular arrow button is activated a specific PWM signal advances the position of the motors, based on the arrow button activated. If the left arrow button 52 or right arrow 54 button is clicked, the first motor 18 generates the pan movement for the position manipulating device 70 and camera 16. If the up or down arrow button 58, 56 is clicked, the second motor 22 generates tilt movement for the position manipulating device 70 and camera 16.

Two additional movement methods which can be implemented within the image tracking software of the present invention are the mouse-tracking and mouse-clicking modes. Specifically, in the mouse-tracking mode, all two dimensional mouse movements are translated to camera movements, until the user releases the mouse button. In the mouse-clicking mode, the software allows the user to click on a point in the image displayed on-screen and responds by moving to center in on that point.

In addition to the arrow buttons, mouse-tracking and mouse-clicking modes, movement of the position manipulating device and camera can be achieved through voice commands such as: "LOOK LEFT", "LOOK RIGHT", "LOOK UP", AND "LOOK DOWN".

In step 500, if the image tracking mode is selected, the program moves to a step 508, wherein the digital video image from the camera 16 is stored for subsequent image processing. The image data output from the digital video camera 16 is in 24-bit (RGB-24) color format transmitted at a rate of 30 Hz. In a step 510, the retrieved stored digital image from the camera is radially scanned from the center of the digital image towards the outer border of the image in order to identify a region of skintone bordered by regions of non-skintone. The point on the digital image at which the radial scanning first starts can be from the center of the image, the previous centroid or defined by the user following a mouse click. In an alternative embodiment, it is possible to provide random access to camera image memory without entire image transmission and no frame rate limitation. In a further alternative embodiment, the tracking algorithm will run on a microcontroller within the device and not on the host computer.

In a step 512, if a region of skintone is not detected, the program returns to step 510, where the next digital image frame from the camera 16 is radially scanned for the purpose of identifying a region of skintone. This process continues until a region of skintone is detected. If the radial scan detects a region of skintone bordered by non-skintone, in a step 514, the centroid of the region of skintone is determined, wherein the centroid identifies the central position of the region of skintone. Once the centroid of the digital image has been determined, in a step 516, the coordinate position of the centroid is calculated. In a step 518, the coordinate position of the centroid is compared with image center coordinates. The coordinate locations of both the centroid and the center of the image are processed in order to determine the displacement of the centroid's coordinate location from the coordinate location of the center of the image. In the step 506, the displacement of the centroid's coordinate location from the center of the image enables the generation of movement instruction, wherein the instruction frames specify camera 16 movement to effect displacement of the centroid to the center of the image.

In a step 520, the movement instruction frames corresponding to the difference in the coordinate positions of the centroid and center of the image are converted to specific pulse width modulated (PWM) signals, where the PWM signals generate the movement of the motors 18, 22. Depending on the position of the centroid relative to center of the image, specific instruction frames are converted to PWM signal which move each motor 18, 22 independently based on whether the corresponding instruction frame determines horizontal pan movement or vertical tilt movement. For example, if the centroid is above and to the left of the center of the image, the first motor 18 will receive a PWM signal for initiating the pan movement of the position manipulating device and camera, wherein the pan movement of the camera causes the centroid to move to the left and toward the center of the image. Similarly, the second motor 22 will receive a PWM signal for initiating the tilt movement of the position manipulating device and camera, wherein the tilt movement of the camera causes the centroid to move downward toward the center of the image. During image tracking mode, the received digital images from the camera 16 are continually stored and radially scanned for the purpose of calculating the coordinate position of the new centroid within each scanned image. After step 520, the process again determines whether the user desired to be in user positioning or in automatic tracking mode at step 500 and either executes step 508 or step 500, respectively.

Figure 13A:
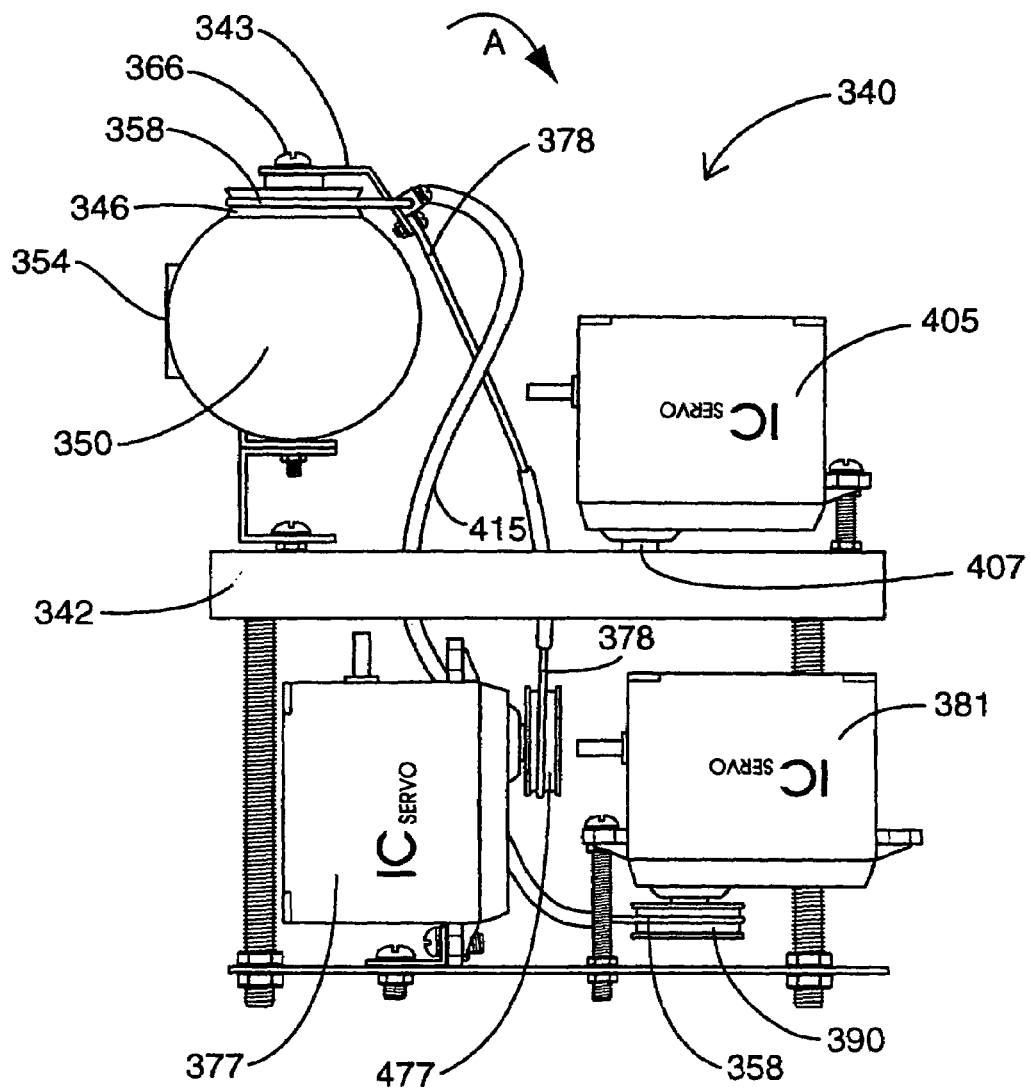
FIG. 13A is a front view of an alternative embodiment of the position manipulation device of image tracking system of FIG. 1.
Figure 13B:
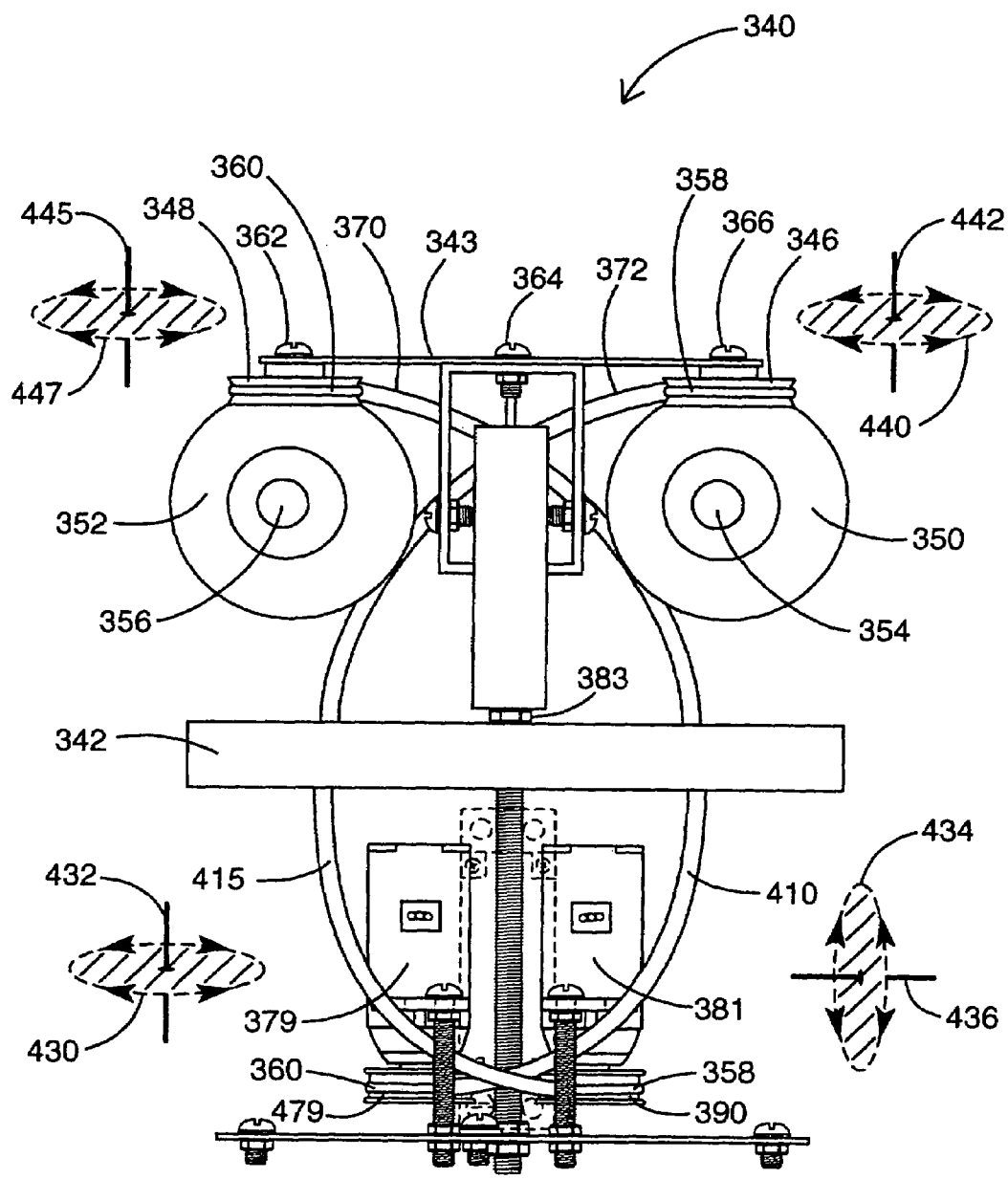
FIG. 13B is a side view of the position manipulation device of FIG. 13A.
Figure 13C:
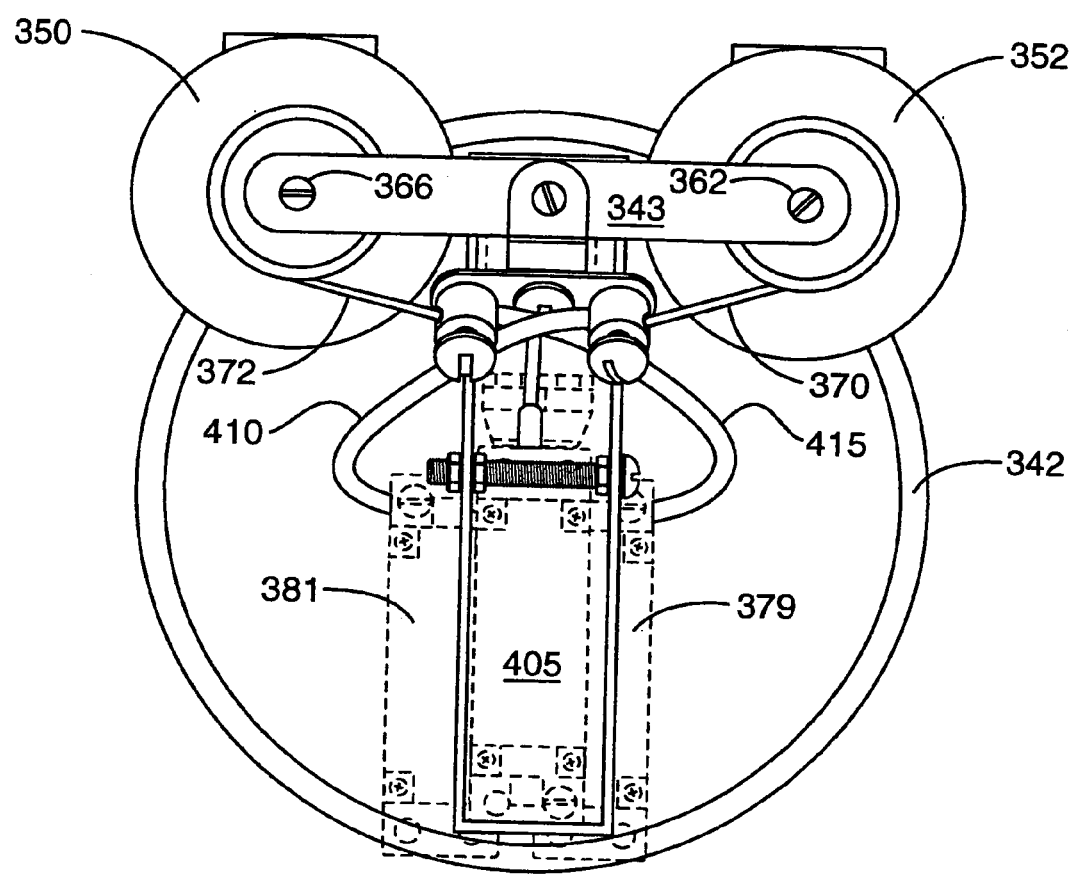
FIG. 13c is a top view of the position manipulation device of FIG. 13A.

FIGS. 13A, 13B and 13C show perspective side, front and top views of an alternative embodiment of the position manipulating device 340 of the present invention, respectively. The second position manipulation device 340 provides a third rotational movement and a fourth rotational movement in addition to the first and second rotational movements which refer to the already described pan and tilt movements.

The second position manipulating device 340 comprises a first motor device 405, a second motor device 377, a third motor device 381 and a fourth motor device 379 for actuating the movement of a first rotatable member (inside annular rim member 342), a second rotatable member 343, a third rotatable member 346 and a fourth rotatable member 348 respectively.

The first motor 405 has a first rotatable shaft member 407, wherein the first motor shaft is drivingly connected to the first rotatable member (not shown). The first rotatable member is a major rotation wheel which has a first rotational movement within a ball bearing filled annular rim member 342. The first rotational movement is referred to as a major pan rotation movement (horizontal rotation), which is defined by a first plane of rotation 430 about a first rotation axis 432. It will be appreciated that in accordance with the present invention the first motor shaft may incorporate a first tendon member (not shown) to actuate movement of the first rotatable member.

The second motor 377 has a second rotatable shaft member 477, whereby the rotation of the second shaft 477 is coupled by a second tendon member 378 to the second rotatable member 343. The second rotatable member is a tilt bar 343. The tilt bar 343 undergoes a second rotational movement, wherein the second rotational movement is a tilt movement defined by a second plane of rotation 434 about a second rotation axis 436.

The third motor 381 has a third rotatable shaft member 390, whereby the rotation of the third shaft 390 is coupled by a third tendon member 358 to the third rotatable member 346. The third rotatable member 346 is a first minor rotation wheel 346. The first minor wheel 346 undergoes a third rotational movement, where the third rotational movement is a first minor pan rotation (horizontal rotation), which is defined by a third plane of rotation 440 about a third rotation axis 442.

Similarly, the fourth motor 379 has a fourth rotatable shaft member 479, whereby the rotation of the fourth shaft 479 is coupled by a fourth tendon member 360 to the fourth rotatable member 348. The fourth rotatable member is a second minor rotation wheel 348. The second minor wheel 348 undergoes a fourth rotational movement, where the fourth rotational movement is a second minor pan movement (horizontal rotation), which is defined by a fourth plane of rotation 445 about a fourth rotation axis 447. It will be appreciated that motors 405, 381, 377, 378 are servo-motors identical to those described in the previous embodiment of FIG. 3A. It will also be appreciated that different types of motors may be used without departing from the scope of the present invention described and illustrated herein.

An image capture device comprising a first digital video camera 354 and a second digital video camera 356 are each enclosed in a first camera housing 350 and a second camera housing 352 respectively. The first camera housing 350 is attached to the first minor wheel 346 and the tilt bar 343 by means of securing member 366. Similarly, the second camera housing 352 attaches to the second minor wheel 348 and tilt bar 343 by means of securing member 362.

The tilt bar 343 attaches to a spring biasing member (not shown) and to the major wheel by means of securing members 383 and 364 respectively. As the tension on the second tendon 378 increases with the rotation action of the second shaft 477, the tilt bar 343 tilts backward in the direction of arrow A against the tension in the spring member (not shown). Conversely, as the tension on the second tendon 378 is reduced by rotating the second shaft 477 in the opposite direction, the tilt bar 343 tilts forward under the counter active force of the spring member (not shown).

Both the first minor wheel 346 and the second minor wheel 348 are also spring loaded using a first and second tension biasing spring (not shown). As the tension on the third tendon member 358 increases with the rotation action of the third shaft 390, the first minor wheel 346 rotates against the tension force of the first tension spring. Also as the tension on the third tendon 358 is reduced by rotating the third shaft 390 in the opposite direction, the first minor wheel 346 rotates in the opposite direction under the counter active force of the first tension spring. Similarly, the tension on the fourth tendon member 360 increases with the rotation action of the fourth shaft 479, where the second minor wheel 348 rotates against the tension force of the first tension spring. As the tension on the fourth tendon 360 is reduced by rotating the fourth shaft 479 in the opposite direction, the second minor wheel 348 rotates in the opposite direction under the counter active force of the second tension spring.

Consequently, both the first and second cameras 354, 356 undergo first and second minor pan movement, tilt movement and major pan movement by individually actuating the first minor wheel 346, second minor wheel 348, tilt bar 343 and major rotation wheel (not shown). The configuration and positioning of the tendons 378, 358, 360, motors 405, 381, 377, 378 and rotatable members 346, 348, 343, (major wheel member) is such that the axial rotation of each rotatable member is independent of all the other rotatable members. This means that rotating individual members about their axes does not restrict or affect axial rotations or orientations of other rotatable members.

This is achieved by ensuring that the second rotation axis 436 of the tilt member 343 (second rotatable member) rotates about the second tendon member 378 and the stationary first rotation axis 432 of the major wheel (first rotatable member). The second tendon 378 is oriented such that a substantial portion of the second tendon is aligned with the stationary first rotation axis 432. In order words the second tendon 378 is also required to be connected between the tilt member and the second motor shaft member 477, such that a fixed point on the second tendon 378 intersects the stationary first rotation axis 432 at a first axis intersection point in a manner whereby the fixed point and intersection point are stationary relative to each other during rotation of the major wheel. Also, the fixed point on the second 378 tendon is fixed relative to the second rotatable member referred to as tilt member 343. The tilt member 343 and the first major wheel are now independent of each other in that rotation of one rotatable member does not affect the axial orientation of the other. Hence, no tension or release is induced in the second tendon 378 by rotating the first major wheel.

The first and second minor rotation wheels 346, 348 are also independent of the first major wheel movement. This is accomplished by ensuring that no tension or release in tendons 358 or 360 is induced by first major wheel movement. This is accomplished by ensuring that a point on the third tendon 358 is fixed relative to the first minor rotation wheel 346 to which it connects during major wheel rotation. A similar independence is achieved by ensuring that a point on the fourth tendon 348 is fixed relative to the second minor rotation wheel 348 during major wheel rotation.

In order to achieve a fixed point along a tendon to its rotatable member (tilt member, first minor wheel, second minor wheel or major wheel or motor shaft member), a flexible fixed length tubing may used to thread the tendon through. As shown in FIGS. 13B and 13C, the third and fourth tendons 358, 360 use plastic tubing 410, 415 to connect motor shafts 390, 479 to the rotatable members (first minor wheel 346 and second minor wheel 348). The plastic tubing must constrain the tendon's shape and provide little friction to the movement of the tendon within the tube. The ends of each tube are fixed relative to the respective rotatable member throughout all other movements. Since the tube constraining each tendon is of fixed length, no tension or release is induced by movements other than actuation of the motor connected directly to the tendon. Axial orientations of the four rotatable members are thus independent of one another.

The position of the motors 405, 381, 377, 378 within the position manipulation device 340 ensure that no motor is responsible for movement of the load or mass of any other motor. It will be appreciated that in accordance with the present invention, the first motor 405 can be positioned below the major wheel and rim member 342, where the first motor 405 can generate movement of the first major wheel by coupling the first motor shaft 407 movement through the use of a first tendon member. FIG. 13A shows that the first motor 405 directly mounted on the major wheel, where the first motor shaft member 407 rotates about a first shaft rotation axis which is longitudinally concentric within the first motor shaft 407. The second motor shaft member 477 rotates about a second shaft rotation axis which is longitudinally concentric within the second motor shaft 407. Also, the third and fourth motor shaft members 390, 479 rotate about a third shaft rotation axis and a fourth shaft rotation axis respectively.

The third and fourth shaft rotation axes are also longitudinally concentric within the third and fourth shaft members 390, 479. In accordance with the present invention, the first, second, third and fourth rotation axes of motors 405, 381, 377, 378 are stationary and fixed relative to one another, each motor generates independent movement of the rotatable members and each motor does not carry the load or mass of any of the other motors.

In the alternative embodiment shown in FIGS. 13A and 13B the first and second digital video cameras provide stereo vision capability, wherein 3-dimensional digital image frames are generated. Each of the first and second video cameras generates 2-dimensional image frames which are processed by means of image processing software in order to provide corresponding 3-dimensional image frames. Whilst stereo vision is already known in the art of robotics and image processing, the use of digital image frames with additional depth perception (third dimension of view) provides more robust tracking capabilities with user enhanced three dimensional viewing using stereo glasses.

The instant invention also incorporates voice activated command options, which can be set up from the user control screen. This enables manual tracking of an object by the user by means of user defined voice commands. As previously discussed, the direction indicator 71 is mounted on the front surface of position manipulation device 70 and indicates to the user that the unit is in operation and further which direction (UP, DOWN, LEFT, RIGHT or a combination thereof) the camera is moving in.

FIG. 14 shows the user control screen 50 generated when the user interface software is first started. The user CONTROL SCREEN™ 50 includes a left arrow button 52, a right arrow button 54, an up arrow button 58, a down arrow button 56, Tuner button 62, Tool Panel button 66 and a Track button 64. The Track button 64 turns the image tracking feature ON and OFF. Once the image tracking feature is OFF, the left arrow button 52, right arrow button 54, up arrow button 58 and down arrow button 56 can be used to manually move the camera to display the camera's video stream in the display portion 60 of the control screen 50. With the image tracking switched ON, the camera will continuously track the image of the user in its field of view. The Tuner button 62 enables the user to fine tune the image settings, such as adjusting video levels for providing reliable tracking and optimizing the images shown on the display portion 60. The Tool Panel button 66 enables the user to control the more advanced features of the image tracking system 10, such as setting up video conferencing sessions, manipulating the display portion 60 size, voice command features and image control functions. Other features of the user interface software include capture of still camera images and adjusting the speed of image tracking.

It should be noted that image tracking system 10 provides a number of significant advantages to videoconferencing and computer users. Since the images are processed using an image processing algorithm, the servo-motors generate rotational movement for the position manipulating device and camera, such that the image of the user is constantly tracked. Also, the position manipulating device provides a configuration of independent stationary servo-motors in order to avoid "motor loading" and to provide efficient movement of the structure using low torque, low cost servo-motors.

It should be understood that various modifications can be made to the preferred and alternative embodiments described and illustrated herein, without departing from the present invention, the scope of which is defined in the appended claims.

The invention claimed is:

1. An image tracking system for use with an image capture device which obtains digitized image frames of an object, the image tracking system comprising:
   (a) a support for holding the image capture device;
   (b) a processing device for determining an object location value for the object based on the digitized image frames generated by the image capture device;
   (c) a position control device coupled to the support for, in use, rotating the support and the image capture device mounted therein about two axes based on the object location such that the object remains within a center region of each of the digitized image frames, said position control device comprising:
      (i) a base;
      (ii) a first motor mounted on the base for generating a first rotational movement based on the object location and a first rotatable member mounted to the base for rotation about a first rotation axis, said first rotatable member being coupled to the first motor;
      (iii) a second motor mounted on the base for generating a second rotational movement based on the object location and a second rotatable member comprising the support mounted to the first rotatable member for rotation about a second rotation axis and being coupled to the second motor;

(iv) said first motor comprising a first shaft member having a first shaft rotation axis longitudinally concentric with the first shaft member, and said second motor comprising a second shaft member having a second shaft rotation axis longitudinally concentric with the second shaft member;

(v) at least one point on the tendon remaining fixed relative to the second rotation axis when said first shaft member rotates and said second shaft member is stationary, such that the first rotatable movement produced by the rotation of the first shaft member is independent of the second rotatable movement produced by the rotation of the second shaft member (vi) at least one point on the tendon remaining fixed relative to the second rotation axis when said first shaft member rotates and said second shaft member is stationary, such that the first rotatable movement produced by the rotation of the first shaft element is independent of the second rotatable movement produced by the rotation of the second shaft element.

2. The image tracking system of claim 1, wherein the first rotation axis and the second rotation axis are orthogonal to each other.

3. The image tracking system of claim 1, wherein said base is adapted to rest on a support surface and has a cavity region formed therein for housing first and second motors.

4. The image tracking system of claim 1, further comprising a mounting member for securing the first motor and the second motor, wherein the mounting member attaches to the base member.

5. The image tracking system of claim 4, wherein said mounting member further comprises a first vertical shaft member for engaging the first rotatable member.

6. The image tracking system of claim 5, wherein the first rotatable member further comprises a cylindrical hollow cavity for rotatably receiving the first vertical shaft member of the mounting member.

7. The image tracking system of claim 1, wherein the first rotational movement is a pan movement and the second rotational movement is a tilt movement.

8. The image tracking system of claim 1, wherein the first axis is stationary.

9. The image tracking system of claim 1, wherein the first rotation axis is a major rotation axis and the second rotation axis is a minor rotation axis rotatable about the first rotation axis.

10. The image tracking system of claim 1, wherein the object has a selected color and the object location is the centroid of a region of the selected color within the digitized image frame.

11. The image tracking system of claim 1, wherein the image capture device is a video camera.

12. The image tracking system of claim 1, wherein the processing device is a microcontroller.

13. The image tracking system of claim 1 wherein the first and/or second rotatable member further comprise a tension regulation device for controlling the amount of tension applied to a tendon, said tension regulation device comprising:

(a) a platform;
(b) a resilient column rotatably mounted on the platform and having a cross-section with a first radius;
(c) a splined column rotatably mounted on the platform and having a plurality of spline members extending radially and having a cross-section with a second outer radius, said splined column being adapted to receive a portion of the tendon therearound;
(d) said resilient column being spaced apart from said splined column and rotatably mounted on said platform at a distance equal to slightly less than the sum of the first and second radius; and
(e) such that in the absence of tension the spline members slightly deform said resilient column to restrict rotational movement of said spline column and said tendon and in the presence of tension, the spline members are forced to travel along the surface of said resilient column and to unwind the portion of the tendon around the splined column.

14. The tension regulation device of claim 13, wherein said platform is mounted within a neck tendon support structure, said neck structure having two orifices, each orifice adapted to receive a portion of the tendon.

15. The tension regulation device of claim 13, wherein said platform is mounted on a vertical shaft, said vertical shaft having a surface being adapted to receive a portion of the tendon.

16. The tension regulation device of claim 13, wherein the axis of rotation of said resilient column is orthogonal to said platform.

17. The tension regulation device of claim 13, wherein the axis of rotation of said splined column is orthogonal to said platform.

18. The image tracking system of claim 1 wherein at least one of the first and/or second rotatable member further comprise a tendon motor pulley for coupling a tendon length to a motor shaft, said tendon motor pulley comprising:

(a) a first disc;
(b) an second disc, the first and second discs having facing surfaces;
(c) a hub positioned concentrically between said first and second discs; and
(d) at least one engagement means extending between the first and second discs and located radially outwardly from the hub, whereby a tendon can travel freely around the hub and the engagement means engages the tendon.

19. The tendon motor pulley of claim 18, wherein said engagement means is a plurality of protrusions and a plurality of recesses, said recesses adapted to receive said protrusions in a snap fit arrangement.

20. The tendon motor pulley of claim 18, wherein said hub is disc-shaped.

21. An image tracking system for use with first and second image capture devices which obtains digitized image frames of an object, the image tracking system comprising:

(a) a first support for holding the first image capture device and a second support for holding the second image capture device;
(b) a processing device for determining an object location value for the object based on the digitized image frames generated by the image capture devices;
(d) a position control device coupled to the supports for, in use, rotating the first and second supports and the first and second image capture devices mounted therein about four axes based on the object location such that the object remains within a center region of each of the digitized image frames, said position control device comprising:

(i) a base;
(iii) a first motor mounted on the base for generating a first rotational movement based on the object location and a first rotatable member mounted to the base for rotation about a first rotation axis, said first rotatable member being coupled to the first motor;
(iii) a second motor mounted on the base for generating a second rotational movement based on the object location and a second rotatable member mounted to the first rotatable member for rotation about a second rotation axis and being coupled to the second motor;
(iv) a third rotatable member comprising the first support and a fourth rotatable member comprising the second support, said third and fourth rotatable members being mounted on the second rotatable member, at least one of said third and fourth rotatable members being rotatably mounted to said second rotatable member; and
(v) a third motor mounted on the base for providing relative rotation between said third and said fourth rotatable members.

22. The image tracking system of claim 21, wherein said third motor provides rotation to said third rotatable member around a third rotation axis and further comprising a fourth motor mounted on the base for providing rotation to said fourth rotatable member around a fourth rotation axis.

23. The image tracking system of claim 22, wherein said third motor generates a third rotational movement based on the object location and rotates the third rotatable member and the fourth motor generates a fourth rotational movement based on the object location and rotates the fourth rotatable member.

24. The image tracking system of claim 23, wherein the first motor comprises a first shaft member having a first shaft rotation axis longitudinally concentric with the first shaft member, the second motor comprises a second shaft member having a second shaft rotation axis longitudinally concentric with the second shaft member, the third motor further comprising a third shaft member having a third shaft rotation axis longitudinally concentric within the third shaft member and the fourth motor further comprises a fourth shaft member having a fourth shaft rotation axis longitudinally concentric within the fourth shaft member, such that the second shaft rotation axis, the third shaft rotation axis and the fourth shaft rotation axis are each motionless and fixed relative to one another.

25. The image tracking system of claim 24, wherein the first shaft rotation axis is also motionless and fixed relative to the second shaft rotation axis, the third shaft rotation axis and the fourth shaft rotation axis.

26. The image tracking system of claim 24 or 25, further comprising a first tendon for coupling the first motor to the first rotatable member, a second tendon for coupling the second motor to the second rotatable member, a third tendon for coupling the third motor to the third rotatable member and a fourth tendon for coupling the fourth motor to the fourth rotatable member.

27. The image tracking system of claim 26, wherein when said first shaft member is stationary, at least one point on said first tendon remains fixed relative to said first rotation axis.

28. The image tracking system of claim 26, wherein when said second shaft member is stationary, at least one point on said second tendon remains fixed relative to said second rotation axis.

29. The image tracking system of claim 26, wherein when said third shaft member is stationary, at least one point on said third tendon remains fixed relative to said third rotation axis.

30. The image tracking system of claim 26, wherein when said fourth shaft member is stationary, at least one point on said fourth tendon remains fixed relative to said fourth rotation axis.

31. The image tracking system of claim 21, wherein the first image capture device comprises a first video camera and the second image capture device comprises a second video camera.

32. A method of tracking an object, said method comprising:
(a) obtaining a series of digitized image frames from the image capture device;
(b) identifying the object within each of the digitized frames; and
(c) providing a first rotational movement to the image capture device about a first rotation axis and providing a second rotational movement to the image capture device about a second rotation axis such that the object remains within a center region of each of the digitized frames, using:
(I) a first motor having a first shaft member with a first shaft rotation axis longitudinally concentric with the first shaft member, and said second motor having a second shaft member with a second shaft rotation axis longitudinally concentric with the second shaft member
(II) a tendon for coupling the second shaft member to the second rotatable member;
(III) at least one point on the tendon remaining fixed relative to the second rotation axis when said first shaft member rotates and said second shaft member is stationary, such that the first rotatable movement produced by the rotation of the first shaft member is independent of the second rotatable movement produced by the rotation of the second shaft member.

33. The tracking method of claim 32, wherein step (b) further comprising:
(i) determining object center location values for the object based on the digitized image frames;
(ii) determining frame center location values for the digitized image frames; and
(iii) comparing the object center location values with the frame center location values to determine the amount of rotation necessary to maintain the object within a center region of each of the digitized frames.

34. The tracking method of claim 33, wherein the digitized image frames contain an object image for the object.

35. The tracking method of claim 34, wherein determining the object center location values for the object comprises calculating the centroid of the object image within each digitized image frame.

36. The tracking method of claim 35, wherein the object image is a region of a selected color.

37. The tracking method of claim 36, wherein the step of determining the object center location values for the object comprises locating a pixel located at the center of a group of pixels within said region of a selected color.

38. The tracking method of claim 36, wherein the step of determining frame center location values comprises calculating the centroid of the digitized image frame.

39. The tracking method of claim 36, wherein step (c) requires rotating the image capture device such that the object center location value and the frame center location value are substantially the same.

40. The tracking method of claim 32, wherein the image capture device is a video camera.

41. The tracking method of claim 32, wherein the image capture device is a first video camera and a second video camera.

42. The tracking method of claim 32, wherein the first motor provides the image capture device with pan movement and the second motor provides the image capture device with tilt movement.

43. The tracking method of claim 42, wherein the pan movement consists of rotation about a major rotation axis and the tilt movement consists of rotation about a minor rotation axis.

44. The tracking method of claim 32, wherein step (c) further comprises using first and second motors mounted on a common base to provide first and second rotational movements to the image capture device.

45. The tracking method of claim 43, wherein the minor rotation axis rotates about the major rotation axis.

46. The tracking method of claim 43, wherein the major rotation axis is stationary relative to said first shaft rotation axis.

47. The tracking method of claim 32, wherein step (c) further comprises providing a third rotational movement to the image capture device about a third axis using a third motor and providing a fourth rotational movement to the image capture device about a fourth axis using a fourth motor such that the object remains within a center region of each of the digitized frames.

48. The tracking method of claim 47, wherein the first rotational movement is a major pan movement, the second rotational movement is a tilt movement, the third rotational movement is a first minor pan movement and the fourth rotational movement is a second minor pan movement.

49. The image tracking system of claim 47, wherein when said first shaft member is stationary, said first rotatable member remains fixed relative to said first axis.

50. The image tracking system of claim 47, wherein when said second shaft member is stationary, said second rotatable member remains fixed relative to said second axis.

51. The image tracking system of claim 47, wherein when said third shaft member is stationary, said third rotatable member remains fixed relative to said third axis.

52. The image tracking system of claim 47, wherein when said fourth shaft member is stationary, said fourth rotatable member remains fixed relative to said fourth axis.

* * * * *

UNITED STATES PATENT AND TRADEMARK OFFICE
CERTIFICATE OF CORRECTION

PATENT NO. : 7,038,709 B1  Page 1 of 1
APPLICATION NO. : 09/702788
DATED : May 2, 2006
INVENTOR(S) : Gilbert Verghese It is certified that error appears in the above-identified patent and that said Letters Patent is hereby corrected as shown below:

Claim 1, column 23, line 11, replace -- (v) at least one point on the tendon remaining fixed relative to the second rotation axis when said first shaft member rotates and said second shaft member is stationary, such that the first rotatable movement produced by the rotation of the first shaft member is independent of the second rotatable movement produced by the rotation of the second shaft member-- with the following:

"(v) a tendon for coupling the second shaft member to the second rotatable member;"

Claim 1, column 23, line 22, replace -- first shaft element -- with "first shaft member"

Claim 1, column 23, line 24, replace -- second shaft element -- with "second shaft member"

Claim 21, column 24, line 61, replace "(d)" with -- (c) --

Signed and Sealed this

Fourteenth Day of November, 2006

JON W. DUDAS
*Director of the United States Patent and Trademark Office*